United States Patent
Perelli et al.

(10) Patent No.: US 11,500,421 B2
(45) Date of Patent: Nov. 15, 2022

(54) FOLDING DEVICE

(71) Applicant: Lenovo (Singapore) Pte. Ltd., Singapore (SG)

(72) Inventors: Thomas Perelli, Durham, NC (US); Ashley Martin Cichocki, Altrincham (GB); Alden Rose, Durham, NC (US); Aaron Michael Stewart, Raleigh, NC (US); Jonathan Jen-Wei Yu, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/100,838

(22) Filed: Nov. 21, 2020

(65) Prior Publication Data
US 2022/0163999 A1    May 26, 2022

(51) Int. Cl.
*G06F 1/16* (2006.01)

(52) U.S. Cl.
CPC .......... *G06F 1/1641* (2013.01); *G06F 1/1652* (2013.01); *G06F 1/1681* (2013.01); *G06F 1/1686* (2013.01); *G06F 1/1688* (2013.01); *G06F 1/1696* (2013.01)

(58) Field of Classification Search
CPC ....................................................... G06F 1/16
See application file for complete search history.

(56) References Cited

U.S. PATENT DOCUMENTS

| | | | |
|---|---|---|---|
| 10,180,704 B1 | 1/2019 | Stewart et al. | |
| 10,296,054 B2 | 5/2019 | Holung et al. | |
| 2010/0064244 A1* | 3/2010 | Kilpatrick, II | G06F 1/1649 715/773 |
| 2017/0227993 A1 | 8/2017 | Holung et al. | |
| 2019/0011955 A1 | 1/2019 | Stewart et al. | |

OTHER PUBLICATIONS

Cunningham, K., Applied Materials, Foldable Phones Bend the Limits of Technology, Jul. 2019 https://www.appliedmaterials.oom/nanochip/nanochip-fab-solutions/july-2019/foldable-phones-bend-the-limits-of-technology (6 pages).

* cited by examiner

*Primary Examiner* — Jerry Wu
(74) *Attorney, Agent, or Firm* — Brian J. Pangrle

(57) ABSTRACT

An apparatus can include a processor; memory accessible to the processor; a base housing; a display housing that includes a center panel and folding wings that fold over the center panel to form a recess for the base housing; and a hinge assembly that couples the display housing to the base housing.

20 Claims, 20 Drawing Sheets

FOLDING DEVICE

TECHNICAL FIELD

Subject matter disclosed herein generally relates to display devices including computers and computer displays.

BACKGROUND

A device can include a housing with a display or housings coupled via one or more hinge assemblies where one or more of the housings can include a display.

SUMMARY

An apparatus can include a processor; memory accessible to the processor; a base housing; a display housing that includes a center panel and folding wings that fold over the center panel to form a recess for the base housing; and a hinge assembly that couples the display housing to the base housing. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
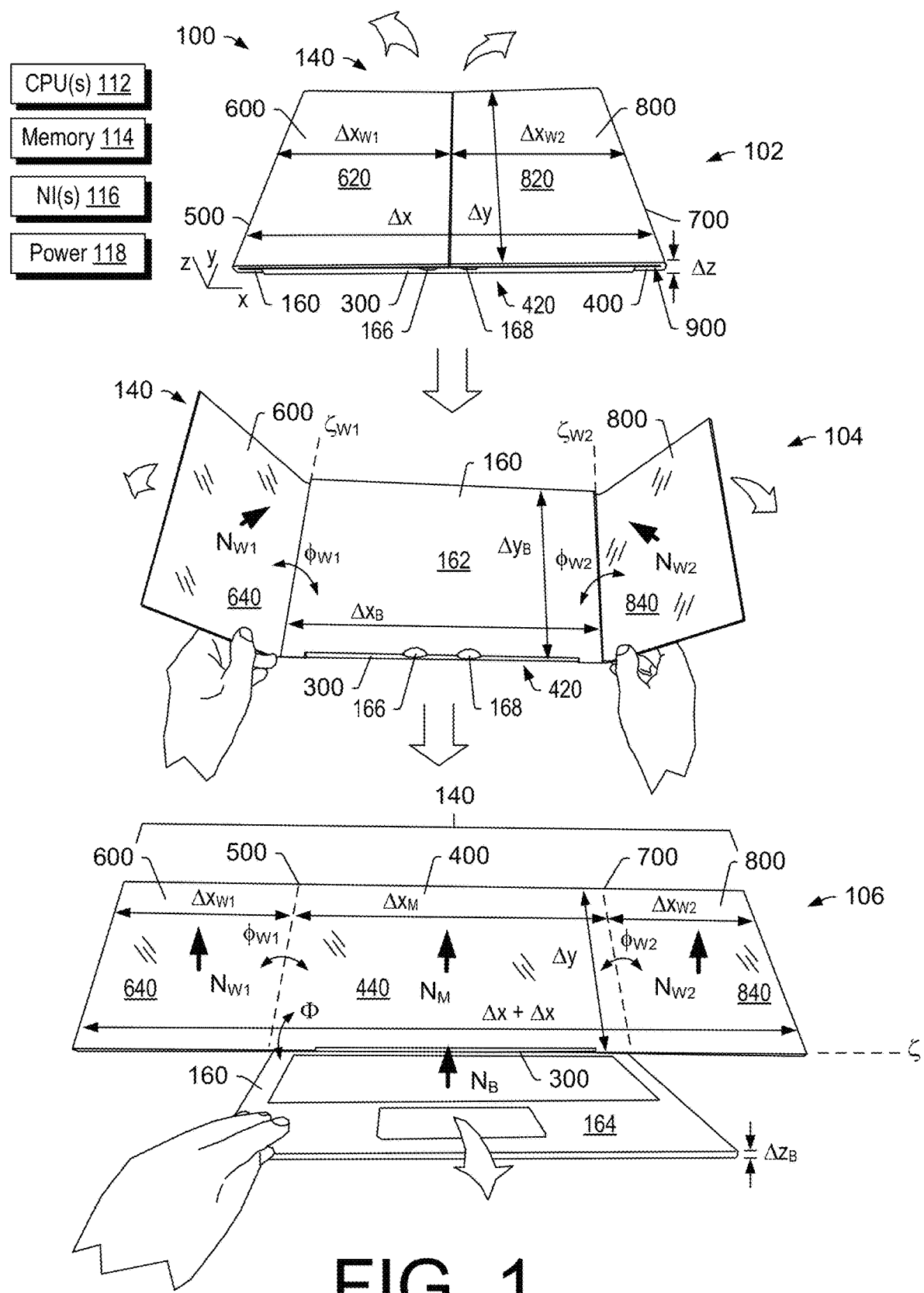
FIG. 1 is a series of views of an example of a device.

FIG. 1 shows an example of a device 100 (e.g., an apparatus) that can include a processor 112 (e.g., one or more processors, one or more cores, etc.), memory 114 accessible to the processor 112, a display housing 140 that includes a center panel 400 and folding wings 600 and 800; a base housing 160; and a hinge assembly 300 that couples the display housing 140 to the base housing 160, where in a closed orientation 102, the base housing 160 is disposed between the center panel 400 and the folding wings 600 and 800 of the display housing 140. The device 100 can be a computing device, a computing system, etc.

In the example of FIG. 1, the device 100 is shown along with a Cartesian coordinate system with an x coordinate axis (x-axis), a y coordinate axis (y-axis) and a z coordinate axis (z-axis). In the closed orientation 102, the device 100 can be characterized by a footprint or an area that can be defined by a widthwise dimension $\Delta x$, a depthwise dimension $\Delta y$, and a thickness $\Delta z$. A volume of the device 100, V, can be approximated by multiplying $\Delta x$, $\Delta y$ and $\Delta z$. For example, where $\Delta x = 33$ cm, $\Delta y = 22.7$ cm, and $\Delta z = 1.8$ cm, the volume V is approximately 1,348 cm$^3$. As mentioned, in the closed orientation 102, the base housing 160 can be disposed between the center panel 400 and the folding wings 600 and 800. For example, the center panel 400 and the folding wings 600 and 800 can define a recess 900 that has a volume $V_r$ sufficient for receiving the base housing 160 in the closed orientation 102. In such an example, the volume $V_r$ is less than the volume V. As an example, the base housing 160 can be of dimensions $\Delta x_B < 33$ cm, $\Delta y_B \leq 22.7$ cm, and $\Delta z_B \leq 1.8$ cm such that the base housing 160 can fit in the recess volume $V_r$.

As shown in the example of FIG. 1, the base housing 160 includes a back surface 162 and a front surface 164, the center panel 400 includes a back surface 420 and a front display surface 440, the wing 600 includes a back surface 620 and a front display surface 640 and the wing 800 includes a back surface 820 and a front display surface 840. Further, hinge assemblies 500 and 700 (e.g., hinges) are shown, which can be wing hinges that couple the wings 600 and 800 to the center panel 400. As an example, the center panel 400 and the wings 600 and 800 may include a continuous display panel that includes the front display surface 440, the front display surface 640 and the front display surface 840. Such a continuous display panel can be a flexible display panel (e.g., a bendable display panel) supported by the center panel 400 and the wings 600 and 800.

In the closed orientation 102, the back surface 420 of the center panel 400, the back surface 620 of the wing 600 and the back surface 820 of the wing 800 are outwardly facing to define an outer surface of the device 100. Such an outer surface can be a wrap-around surface that may be defined as a 360 degree surface where a split exists between the back surface 620 and the back surface 820. In the example of FIG. 1, the wings 600 and 800 can be of approximately the same widthwise dimensions, for example, consider $\Delta x_{W1}$ and $\Delta x_{W2}$ be approximately equal. In such an example, the split can be approximately midway between the hinge assemblies 500 and 700.

As shown in FIG. 1, the base housing 160 and/or one or more of the wings 600 and 800 can include one or more features such as, for example, finger notches 166 and 168, which can be utilized by a user to insert a finger or a portion thereof (e.g., a fingertip, a fingernail, etc.) between the back side 162 of the base housing 160 and the front display side 640 of the wing 600 and/or the front display side 840 of the wing 800. As an example, a single central feature may be provided or, for example, separate features (e.g., one for each of the wings 600 and 800).

In FIG. 1, the orientation 104 is an intermediate or transitional orientation of the device 100 where the wings 600 and 800 are being opened, for example, by a left hand and a right hand of a user. As shown, the hinge assemblies 500 and 700 can define axes $\zeta_{W1}$ and $\zeta_{W2}$ about which angles $\phi_{W1}$ and $\phi_{W2}$ of the wings 600 and 800, respectively, may be measured, for example, with respect to the center panel 400 or the base housing 160. As shown, each of the front display surfaces 440, 640 and 840 can be substantially planar where a respective normal (e.g., normal vector) can be defined $N_M$, $N_{w1}$ and $N_{W2}$. As an example, the angles $\phi_{W1}$ and $\phi_{W2}$ may be measured using the normals $N_M$, $N_{W1}$ and $N_{W2}$. As the wings 600 and 800 are rotated to open the wings 600 and 800, the device 100 can be transitioned to an open orientation 106, which may be a fully open orientation; noting that the device 100 may be usable with one or more both the wings 600 and 800 angled such that the display surfaces 640, 440 and 840 are not within a common plane.

In the example of FIG. 1, the fully open orientation 106 shows the normals $N_M$, $N_{W1}$ and $N_{W2}$ as being in a common direction such that a continuous substantially planar display is provided where the angles $\phi_{W1}$ and $\phi_{W2}$ are each approximately 180 degrees (e.g., +/−5 degrees). As an example, one or more of the angles $\phi_{W1}$ and $\phi_{W2}$ may be less than 180 degrees such that a more "surround" experience is provided for a user. For example, consider the normals being $N_M$, $N_{W1}$ and $N_{W2}$ being directed substantially at a user's head and, for example, more particularly at a user's eyes. In such an example, the user may have acceptable vision across the front display surfaces 440, 640 and 840. Such an orientation may provide a user with a cockpit experience, which may be beneficial for various types of work tasks, process monitoring tasks, simulation tasks, virtual reality tasks, training tasks, gaming tasks, etc.

In the example of FIG. 1, as the wings 600 and 800 are opened, the back side 162 of the base housing 160 is exposed, which can provide for user access and rotation of the base housing 160 with respect to the display housing 140 via the hinge assembly 300, which can define an axis $\zeta$. In the orientation 106, an angle $\Phi$ is shown as being measured about the axis $\zeta$ and between the front display surface 440 of the center panel 400 and the front surface 164 of the base housing 160. In the example of FIG. 1, the front surface 164 of the base housing 160 can be substantially planar where a normal (e.g., normal vector) can be defined $N_B$. As shown, the angle $\Phi$ can be measured using the normals $N_M$ and $N_B$ (e.g., normal vectors).

In the example of FIG. 1, the device 100 can provide a display area that is greater than an area of the front surface 164 of the base housing 160 while being able to provide a footprint or area in a closed orientation that may be approximately equal to the base housing 160, which may facilitate transport, storage, etc.

As an example, the base housing 160 may be a keyboard housing that includes a keyboard and optionally one or more other features (e.g., a touchpad, a biometric reader, etc.). As an example, the front surface 164 can include a keyboard (e.g., a touch-typing keyboard such as a QWERTY keyboard, etc.) and/or can include one or more touchpads.

As an example, a device can include a closed orientation where there is a divide down a center of the device, forming a center seam. In such an example, a user can open the device from the center seam where a half-size display can open to the left and a half-size display can open to the right where a half-size is half of a size of a center or main display. In such an example, the user can expose a back side of a keyboard housing that can be rotated to form at least a portion of a base that can support a main display and the two half displays. In such an example, the main display can be a center display that may be seamlessly connected to the left and right half displays. As an example, a hinge assembly that operatively couples the keyboard housing and the displays may be a friction type of hinge that can maintain a position of the displays with respect to the keyboard housing. As an example, the center of gravity of the displays may be at a height that is no greater than without the half displays (e.g., without wings); noting that the center of gravity may depend on the open angle of each of the half displays, where, for open angles (see, e.g., $\phi w_1$ and $\phi w_2$) that are each less than 180 degrees, there may be an increase in the height of the center of gravity; however, with a more forward position, which may be stabilized via a base housing. In a planar orientation of the displays, the height of the center of gravity may be the same as with a center display alone. As an example, one or more of the center display and the wings may include a stand that can be utilized, for example, to support the device (e.g., for touch-screen touching, etc.). As an example, a stand may extend from a back side of a display housing and may include a stored state and an extended state. As an example, a stand may be a flat panel, a leg, a gusset, etc., which may be pulled out of a back side of a display housing. As an example, a stand may extend automatically responsive to opening one or more portions of a device. For example, consider a stand that opens responsive to rotation about the hinge assembly 300 of the base housing 160. In such an example, the stand may be mechanically linked to the hinge assembly 300 and, for example, spring loaded.

Figure 2:
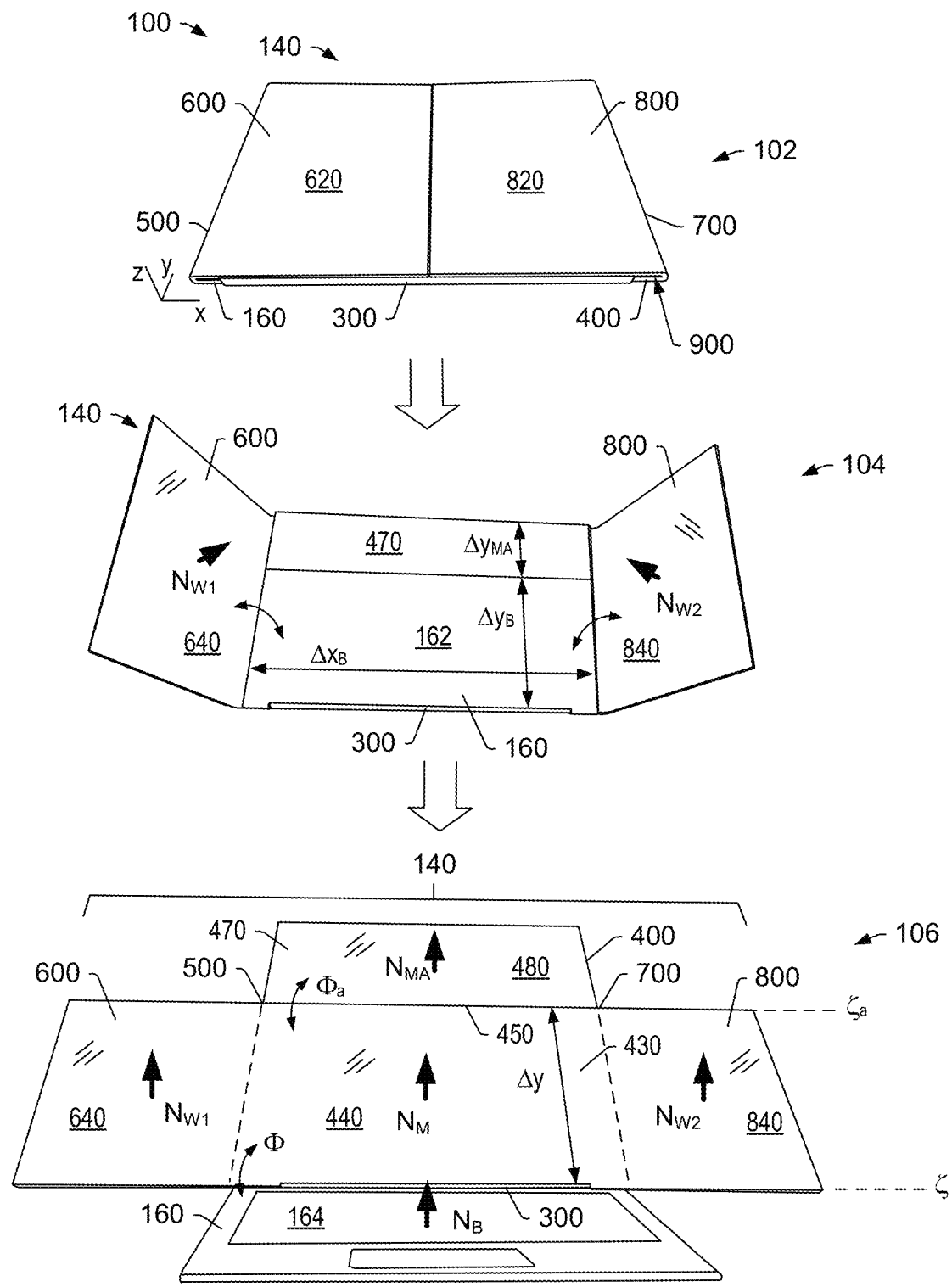
FIG. 2 is a series of views of an example of a device.

FIG. 2 shows an example of the device 100 of FIG. 1 where the center panel 400 includes a portion 430 and a portion 470 operatively coupled via a hinge assembly 450. In such an example, the base housing 160 can be of an area less than the portion 430 such that, in the closed orientation 102, the portion 470 can the base housing 160 can be covered by the wings 600 and 800. In the example of FIG. 2, the portion 470 is shown as having a dimension $\Delta y_{MA}$ where $\Delta y_{MA}$ plus $\Delta y_B$ may be approximately equal to $\Delta y$. As shown, the portion 470 can include a display surface 480 that can be defined by a normal $N_{MA}$, which may be oriented via an angle $\Phi_a$ about an axis $\zeta_a$ of the hinge assembly 450.

Figure 3A:
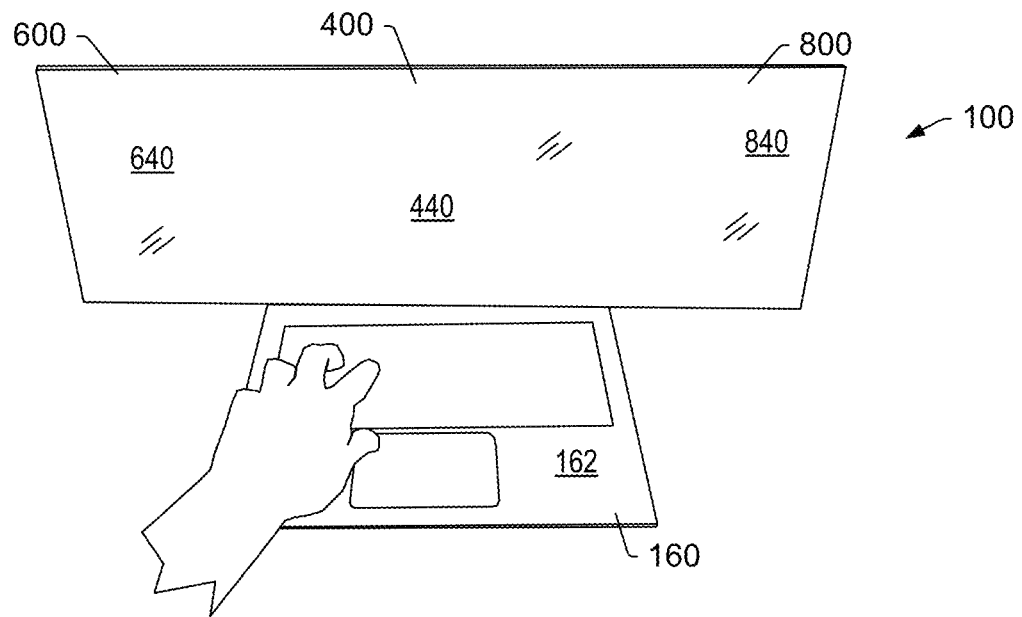
FIG. 3A and FIG. 3B are perspective views of an example of a device.
Figure 3B:
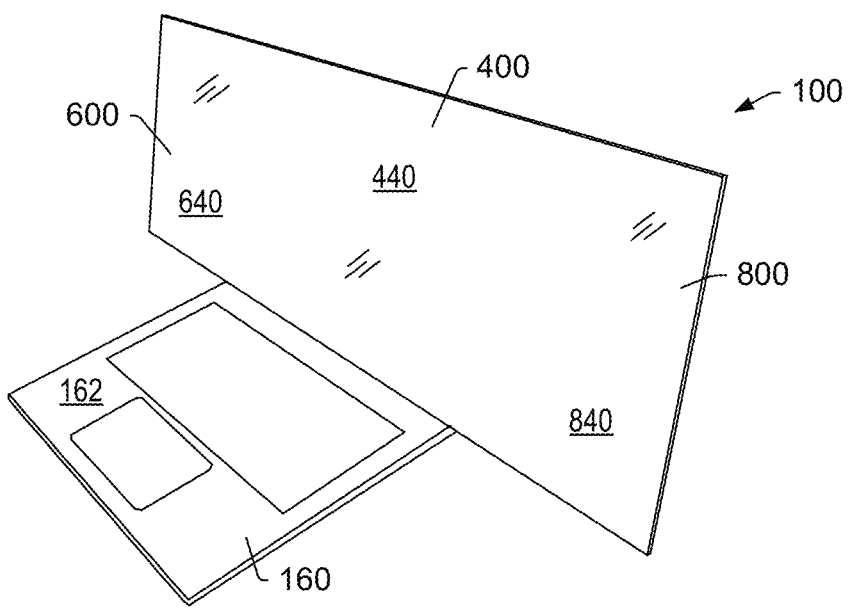

FIG. 3A and FIG. 3B show two perspective views of the device 100 as including the base housing 160, the center panel 400 and the wings 600 and 800. As shown, the device 100 can have a display area that is approximately twice the area of the front surface 162 of the base housing 160 (e.g., double the area of the display surface 440).

Figure 4A:
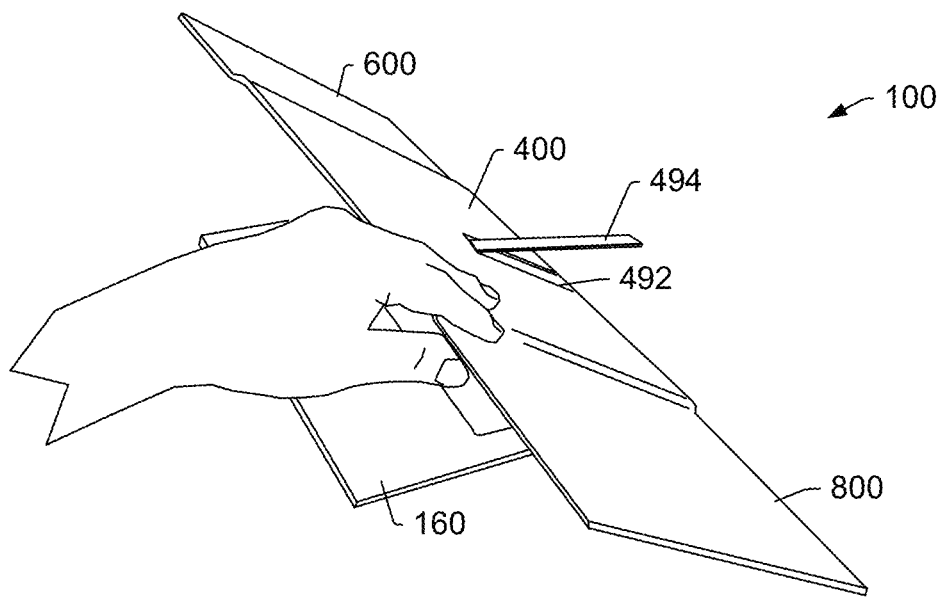
FIG. 4A and FIG. 4B are perspective views of an example of a device.
Figure 4B:
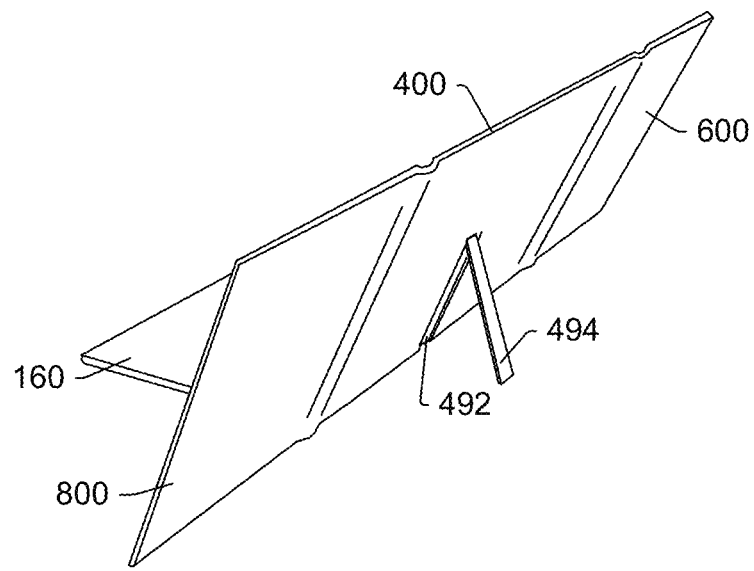

FIG. 4A and FIG. 4B show two perspective views of the device 100 as including the base housing 160, the center panel 400 and the wings 600 and 800 where the center panel 400 includes a recess 492 and a stand 494 that can extend from the recess 492. As mentioned, a stand may be spring-loaded and extend automatically upon rotation about a hinge assembly. For example, the center panel 400 can include a hinge assembly that operatively couples to the stand 494.

Figure 5:
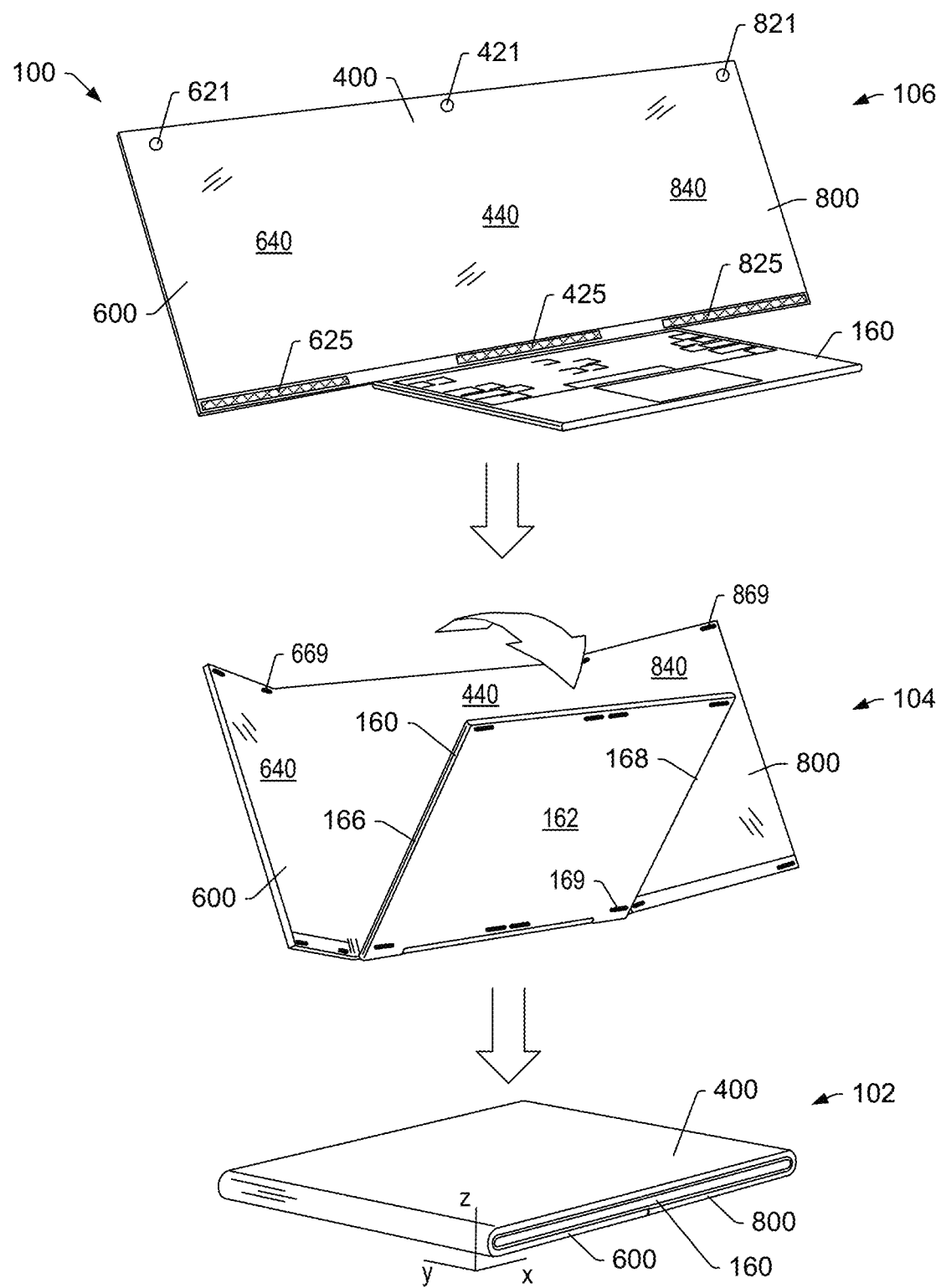
FIG. 5 is a series of views of an example of a device.

FIG. 5 shows the device 100 in the orientations 102, 104 and 106 where, as shown in the orientation 106, the device 100 includes cameras 421, 621 and 821 and/or speakers 425, 625 and 825. In such an example, multiple cameras may be utilized to generate a multi-perspective view such as a stereoscopic view, a holographic view, etc., and/or multiple speakers may be utilized to generate a surround sound experience, for example, with a center channel, a left channel and a right channel. In such an example, a center channel may be a bass channel (e.g., a low frequency channel) while the left and right channels may be for higher frequencies (e.g., mid-range, tweeters, etc.).

In the orientation 106, the center panel 400 and the wings 600 and 800 are substantially in a common plane, with the wings 600 and 800 open to approximate 180 degrees with respect to the center panel 400. As mentioned, an angle or angles of wings may be less than 180 degrees. Where the cameras 621 and 821 are included, the wings 600 and 800 may be positioned at less than 180 degrees with respect to the center panel such that an axis of a field of view (FOV) of the camera 621 and an axis of a FOV of the camera 821 differ from an axis of a FOV of the camera 421. Also, where the speakers 625 and 825 are included, the wings 600 and 800 may be positioned at less than 180 degrees with respect to the center panel such that an axis of the speaker 621 and an axis of the speaker 825 differ from an axis of the speaker 425, which may provide for an enhanced surround sound experience. For example, consider a speaker axis of the speaker 625 being directed at a user's left ear and a speaker axis of the speaker 825 being directed at a user's right ear. As shown, adjustment of the wings 600 and 800 may allow a user to tailor one or more of a surround sound experience, a visual experience, a camera/video experience, etc.

As an example, a camera may be part of a sub-assembly, which may include a light, which may be a flash, a video light, etc. Or, for example, the wings 600 and 800 may include separate lights. As an example, where a user desires utilization of a display of the center panel 400, the displays of the wings 600 and 800 may be oriented and rendered with a color and intensity of light fully or over one or more portions to provide facial lighting for a user that may be in a videoconference, etc. As an example, where a user desires a photograph such as a headshot, the user may utilize one or more cameras and the wings 600 and 800 for purposes of lighting (e.g., for normal effect, for special effect, etc.).

As an example, the device 100 may be utilized for gaming, optionally including interactive gaming. As an example, the cameras 421, 621 and 821 and/or the speakers 425, 625 and 825 may be utilized to enhance gaming. As an example, the cameras 421, 621 and 821 may be utilized for avatar creation and/or control. In such an example, the cameras 421, 621 and 821 may provide for capture of head and/or facial movements (e.g., consider facial expressions, etc.). In such an example, a user's head and/or face may be part of a game or a gaming experience. As an example, a camera may be a laser camera such as a laser scanner where a laser can emit one or more beams and where beam energy may be captured (e.g., using a camera area or other appropriate sensor(s)) as appearing on an object (e.g., a user's head and/or face) and/or as reflected. As an example, a LIDAR technique may be utilized for scanning, measuring distance, etc., by illuminating a target object with laser light and measuring the reflection with a sensor. In such an example, differences in laser return times and wavelengths may be used to make one or more digital 3-D representations of the target object.

As an example, the device 100 can include one or more microphones, which may be provided as one or more microphone arrays. In such an example, a videoconferencing application, a voice recognition application, a gaming application, etc., may utilize such one or more microphones. As an example, a camera sub-assembly may include one or more microphones. As an example, one or more microphones may be included with the center panel 400, the wing 600 and/or the wing 800. As an example, a microphone may be defined in part by an axis. In such an example, where the microphone is a microphone of a wing, the axis may be adjustable by adjusting the wing.

In the example of FIG. 5, the base housing 160 is shown as including opposing edges 166 and 168 (e.g., a left edge and a right edge). As an example, the edges 166 and 168 may be curved (e.g., radiused) such that they are not sharp and/or otherwise reduce risk of damage to one or more of the display surfaces 440, 640 and 840, particularly in the closed orientation 102. As an example, the back surface 162 of the base housing 160 can include one or more features, textures, materials, finishes, etc., to reduce risk of damage to one or more of the display surfaces 640 and 840, which, in the closed orientation 102, face the back surface 162. As an example, the back surface 162 may include one or more feet 169 positioned at or near an edge such that one or more surfaces 669 of the wing 600 and/or one or more surfaces 869 of the wing 800 contact to help assure that a display surface is at a reduced risk of damage, particularly in the closed orientation 102 where a user may grasp the device 100 with some amount of force and/or place an object on top of the device 100 (e.g., during storage, transport, etc.).

As shown in the example of FIG. 5, in the closed orientation 102, the folds of the wings 600 and 800 can be defined by a radius, which may be a radius of curvature. For a curve, the radius of curvature equals the radius of the circular arc which best approximates the curve at a given point. A radius of curvature can include an imaginary center of curvature and an imaginary circle completing the curve. As an example, a radius of curvature may be for an arc that spans 180 degrees such that end tangents may be drawn that are parallel lines. For example, in the closed orientation 102, the wings 600 and 800 are shown as being parallel to the center panel 400.

As an example, the wings 600 and 800 may be slightly anti-parallel, which may provide for an improved grip. For example, the wings 600 and 800 may form a V-shape (e.g., a slight V-shape) such that with a user's palm at the hinge assembly 500 or the hinge assembly 700, the user's thumb and fingers may be closer together than twice the radius of curvature, which may define a diameter or a thickness at an edge of the device 100 (e.g., an edge at the hinge assembly 500 or an edge at the hinge assembly 700). As an example, a radius of curvature (e.g., as measured at an outer surface) may be slightly increased from a minimum thickness, which may provide for less wear of a continuous display and/or provide for use of a continuous display with a larger minimum radius of curvature.

As shown in FIG. 5, the center panel 400 and the wings 600 and 800 can form a recess where the shape of the recess can be a stadium or a modified stadium. A stadium, also called a discorectangle, obround, or sausage body, is a geometric shape that can be defined by a rectangle with top and bottom lengths and ends that are capped off with semicircles of radius r. As to a modified stadium, consider one or both ends that may differ from a semicircle. For example, consider an end that may be defined by a semiellipse, a semioval, etc.

FIG. 5 shows a Cartesian coordinate system with x, y and z-axes. As shown, the center panel 400 and the wings 600 and 800 can form a recess with a cross-sectional shape that can be defined in an x, z-plane. In such an example, a height of the recess can be along the z-axis and a length or width of the recess can be along the x-axis, while a depth of the recess can be along the y-axis. In the example of FIG. 5, the width of the base housing 160 is less than that of the recess and the thickness of the base housing 160 is less than that of the recess (e.g., for at least the portion thereof that is to be disposed in the recess).

As shown in FIG. 5, the wings 600 and 800 can be angled with respect to the center panel 400. In such an example, an each of the wings 600 and 800 can define an anhedral angle or cant angle with respect to the center panel 400.

Figure 6:
FIG. 6 is a perspective view of an example of a device.

FIG. 6 shows a perspective view of the device 100 where the device 100 is being utilized for a gaming application. The gaming application can be executed for rendering of imagery to the display surfaces 440, 640 and 840. For example, the scene rendered can include military personnel in a battle where a user may be a character with a view into the scene and/or a character rendered in the scene. As shown, the wings 600 and 800 are angled at less than 180 degrees with respect to the center panel 400 such that a more surround experience is created, for example, akin to a real-world peripheral view, a cockpit of a vehicle, a plane, etc.

Figure 7A:
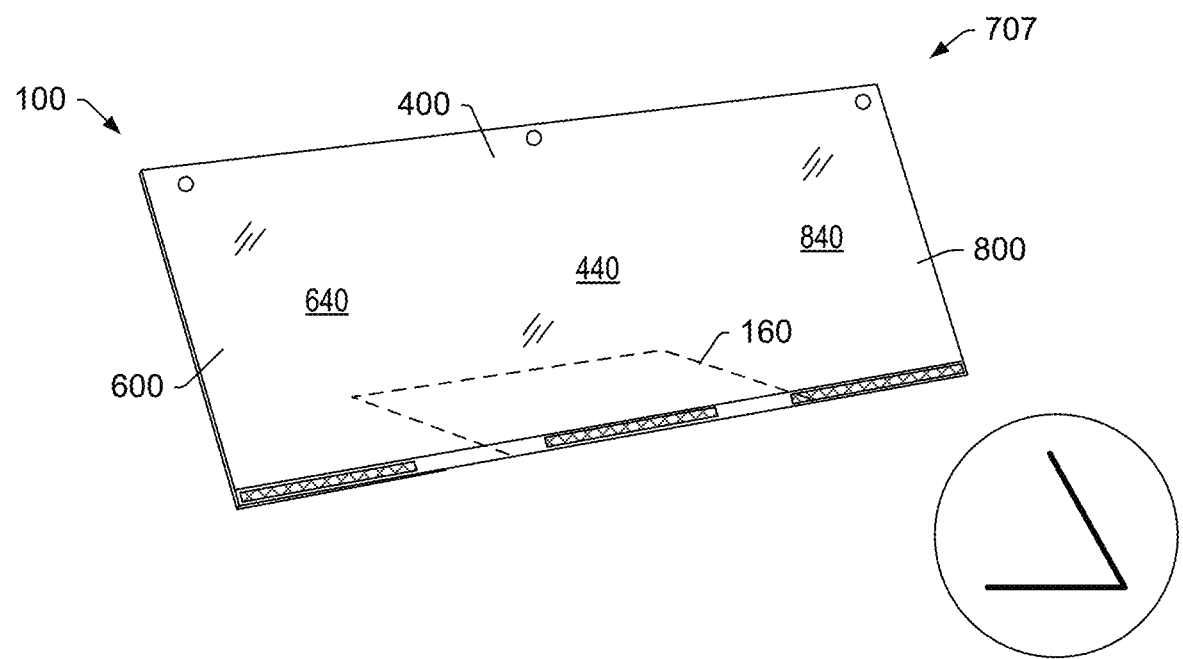
FIG. 7A and FIG. 7B are perspective views of an example of a device.
Figure 7B:
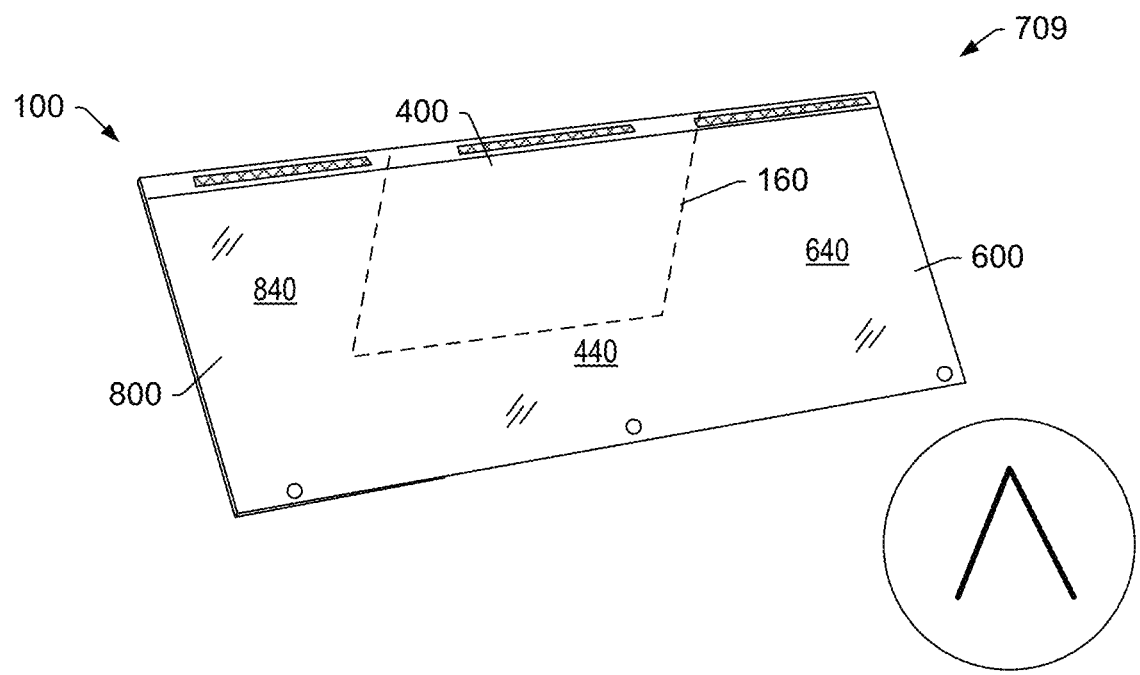

FIG. 7A and FIG. 7B show example orientations 707 and 709 of the system 100 where, in the orientation 707, the base housing 160 (outlined via dashed lines) is behind the display surfaces 440, 640 and 840 and supporting the center panel 400 and the wings 600 and 800 and where, in the orientation 709, the base housing 160 forms a tent with the center panel 400 and the wings 600 and 800, noting that the display surfaces 440, 640 and 840 are flipped by 180 degrees compared to the orientation 707. The orientations 707 and 709 may be suitable for a wide-screen video experience, for example, where various human input device (HID) features of the base housing 160, if present, are not utilized.

Figure 8:
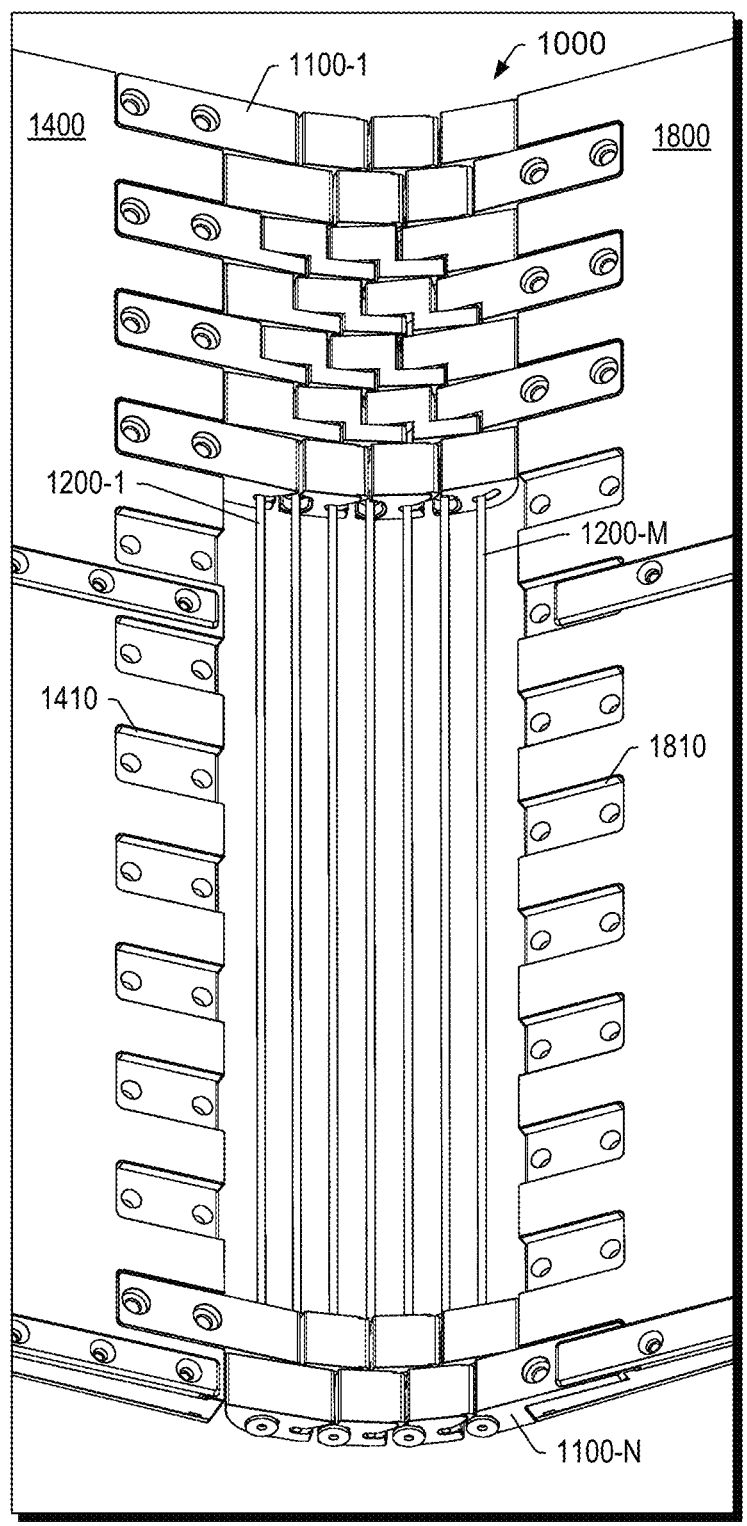
FIG. 8 is a perspective view of an example of a hinge assembly.

FIG. 8 shows a perspective view of an example of a hinge assembly 1000, which may be suitable for use as the hinge assembly 500 or the hinge assembly 700 of the device 100. In FIG. 8, the hinge assembly 1000 is shown as operatively coupling a panel 1400 and a wing 1800. In FIG. 8, various components and/or features can be present in multiples. As shown, the panel 1400 and the wing 1800 can include recesses 1410 and 1810, respectively, to receive links of link assemblies 1100-1 to 1100-N. As shown, the hinge assembly 1000 can include rods 1200-1 to 1200-N, which are received by the link assemblies 1100-1 to 1100-M. In the example of FIG. 8, the number of link assemblies is twenty-four (e.g., N=24) and the number of rods is seven (e.g., M=7), noting that another number of link assemblies and/or another number of rods may be utilized.

In the example of FIG. 8, some of the link assemblies may be active link assemblies and some of the link assemblies may be dummy link assemblies. For example, an active link assembly can dictate movement while a dummy link assembly may be a spacer, act as a guide, etc. For example, in FIG. 8, the link assemblies 1100-1 and 1100-2 can be dummy link assemblies while the next four link assemblies 1100-3, 1100-4, 1100-5 and 1100-6 can be active link assemblies. As an example, a device can include two active link assemblies, four active link assemblies, 6 active link assemblies, etc. As an example, active link assemblies can be in pairs where one pair may be proximate to one side of a device and another pair may be proximate to another, opposing side of the device. In the example of FIG. 8, the hinge assembly may include eight active link assemblies (e.g., four proximate to one side and four proximate to another, opposing side). As an example, rods may extend from one side to another side or may be shorter. For example, consider one set of rods for one set of link assemblies and another set of rods for another set of link assemblies.

As an example, rods can include ends that may be threaded for coupling to bolts or other component such that rod tension can be adjustable where a higher tension may act to clamp various components of the hinge assembly 1000 in a manner that provides a desired amount of friction. For example, where washers are disposed between adjacent link assemblies, an increase in tension may provide for an increase in friction against surfaces of the washers. As an example, tension may be adjustable for purposes of ergonomics such that tension is tailored to user experience where a device can be positioned by a hand or hands of a user while being able to maintain the desired position without creeping movement, etc., which may be due to the influence of gravity. As an example, the hinge assembly 1000 may be characterized using one or more torques. In such an example, a gravity torque may be overcome through use of friction and/or one or more other techniques (e.g., mechanical stops, magnets for magnetic forces, etc.).

Figure 9:
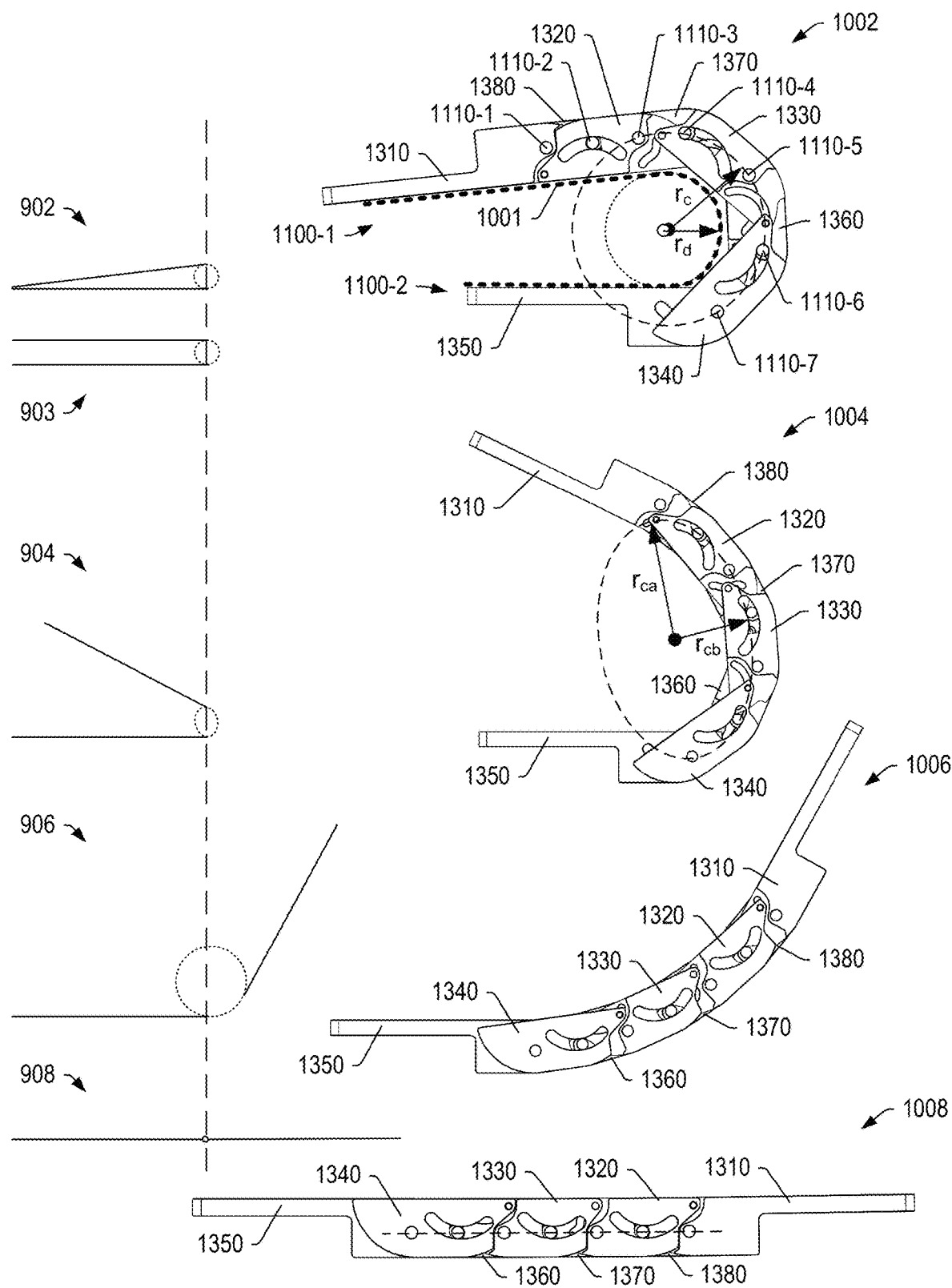
FIG. 9 is a series of side views of an example of a hinge assembly.

FIG. 9 shows schematic diagrams 902, 903, 904, 906 and 908 of examples of devices or portions of devices where the schematic diagrams 902, 904, 906 and 908 can correspond to example orientations 1002, 1004, 1006 and 1008 of link assemblies 1100-1 and 1100-2, as active link assemblies, which may be considered to be a pair of link assemblies. For example, FIG. 8 shows an even number of link assemblies 1100-1 to 1100-N, which includes twelve link assembly pairs.

FIG. 9 also shows an example of a continuous, bendable display 1001 (see thick dashes) with respect to the link assemblies 1100-1 and 1100-2 in the closed orientation 1002. As shown, the display 1001 may be defined by a radius $r_d$, which may be measured from a center of a circle (see thin dotted circle) that, in part, overlaps a mid-plane of the display 1001, which can be a display assembly (e.g., including multiple layers). FIG. 9 shows another circle (see thin dashed circle) with radius $r_c$ that passes through various features, which is explained further below. A circle can be a geometric object with a constant curvature; whereas, for example, an oval or an ellipse can be a geometric object that has a non-constant curvature over at least some portions of the oval or the ellipse.

Curvature is a value that measures how curved is the curve at a point on a curve. At any point P on a curve there is a circle of right size that touches P and fits the most (e.g., most-fitting circle an osculating circle). The flatter the curve at P, the larger is its osculating circle; whereas, the sharper the curve at P, the smaller is its osculating circle. The value of curvature can be defined as 1/r, where r is the radius of the osculating circle. When the osculating circle is large, the curve is flattish, and the curvature 1/r is small.

As an example, a hinge assembly may be structured with respect to a continuous, bendable display such that a bendable portion is to have relatively constant curvature. Such an approach may be provided for one or more purposes, which may provide for reducing stresses (e.g., compressive stresses and/or tensile stresses) of a continuous, bendable display, which may be, for example, a laminated structure (e.g., stacks of layers, etc.).

In FIG. 9, the pair of link assemblies 1100-1 and 1100-2 can be orientated from an angle less than 0 degrees (see the orientation 1002) to an angle of 180 degrees (see the orientation 1008). As an example, the link assembly 1100-2 may be coupled to a center panel and the link assembly 1100-1 may be coupled to a wing. As explained, the wings 600 and 800 may be configured to close such that a slight V shape is formed with the vertex along a seam where the wings 600 and 800 may meet with or without contact. As an example, a hinge assembly may have a minimum angle that is approximately 0 degrees.

In the example of FIG. 9, the link assembly 1100-1 includes links 1310, 1320, 1330 and 1340 while the link assembly 1100-2 includes links 1350, 1360, 1370 and 1380. As shown, the links 1310 and 1350 are end links that can be coupled to a housing, a panel, a wing, etc., for example, the end link 1310 may be coupled to a wing and the end link 1350 may be coupled to a center panel. As shown in the orientations 1002, 1004, 1006 and 1008, the end link 1350 may remain in a plane or fixed position (e.g., horizontal in FIG. 9) while the end link 1310 changes over a range of angles from less than 0 degrees (see the orientation 1002) to 180 degrees (see the orientation 1008), where 0 degrees may be horizontal in FIG. 9.

In the example of FIG. 9, a radius of curvature, $r_c$, is shown for the pair of link assemblies 1100-1 and 1100-2 (see the thin dashed circle), which can change as the pair of link assemblies 1100-1 and 1100-2 operates, where, at 180 degrees, the radius of curvature can be infinity (e.g., essentially no curvature as curvature can be 1/r). As an example, the center of the radius of curvature, $r_c$, may be offset from a center of curvature of the continuous, bendable display 1001 or, for example, they may be substantially aligned. As mentioned, a hinge assembly may aim to provide for bending of a continuous, bendable display such that a bending region thereof maintains a relatively constant curvature at any given angle (e.g., from closed to open). For example, the display 1001 may have an increasing radius of curvature from orientation 1002 to 1004 to 1006 where the bending region of the display 1001 can have a relatively constant curvature.

The views in FIG. 9 are ordered from top to bottom with increasing radius of curvature where the top view may be considered a minimum radius of curvature and the bottom view may be considered a maximum radius of curvature. In such minimum and/or maximum orientations, mechanical features may contact to define the minimum and/or maximum radii of curvature.

The example pair of link assemblies 1100-1 and 1100-2 are also shown as including bores 1110-1, 1110-2, 1110-3, 1110-4, 1110-5, 1110-6 and 1110-7 that can receive respective rods such as the rods 1200-1 to 1200-M of the hinge assembly 1000 of FIG. 8. In the orientation 1002, the radius of curvature, $r_c$, is shown as being defined using the centers of the bores 1110-3 to 1110-7. In the 180 degree orientation 1008, the centers of the bores 1110-1 to 1110-7 are aligned along a straight line. As shown, a radius of curvature may be defined by fewer than all of the bores 1110-1 to 1110-7. Further, the pair of link assemblies 1100-1 and 1100-2 can include features that provide for desired movement that may differ from an arcuate movement defined by an arc of a circle. For example, features may provide for a lifting movement, which may be an initial lifting movement in transitioning from a closed orientation to an open orientation such as a transition from the orientation 1002 to the orientation 1004.

A comparison between the orientations 1002 to 1004 shows that a lifting movement of the end link 1310 can provide for elongation of the circle with the radius $r_c$ to a more oval shape, which may be approximated by an ellipse, for example, with a major radius $r_{ca}$ and a minor radius $r_{cb}$. As shown, in the orientation 1002, the end link 1310 overhangs the end link 1350. And, as shown in the schematic diagram 902, the top portion is longer than the bottom portion (e.g., consider a hypotenuse of a right triangle). Such an arrangement may be utilized where the bottom portion is to be supported on a support surface such as a desktop, tabletop, countertop, etc., which may remain stationary such that the bottom portion remains stationary and such that the end link 1350 remains stationary. As an example, where a hinge assembly has a closed orientation of approximately 0 degrees rather than less than 0 degrees, a top portion and a bottom portion may be of a common length. For example, the schematic diagram 903 shows top and bottom portions of a common length. In the schematic diagram 903, a clearance exists between the top portion and the bottom portion that may be defined by a diameter, which can be twice a radius of curvature. As mentioned, such a clearance may define a recess where a housing may be received in the recess. And, for example, a recess may be defined where an angle less than 0 can be achieved, which may provide a clearance between an end of the top portion and an end of the bottom portion.

Where the pair of link assemblies 1100-1 and 1100-2 is utilized for a wing and a center panel, respectively, the wing may be a top portion and the center panel may be a bottom portion as illustrated in the schematic diagrams 902, 903, 904, 906 and 908. As an example, a housing received in a recess defined by the wing and the center panel may limit the position of the wing; whereas, if the housing is not received in the recess, the wing may be capable of closing further where, for example, and end of the wing may contact the panel where such contact may be at or near an edge such that a display is not at risk of damage. As an example, a user may desire privacy such that people cannot view what is rendered to a display of a device. In such an example, the user may fold the wings over the center panel while the device is supported by a base housing, which may be a keyboard housing. As an example, one or more operating system features may be programmable to be triggered by wing position or wing positions. For example, closing a wing over a center panel may trigger a transition to a lower power state, etc. (e.g., where rendering to the display is halted). In such an example, opening of the wing may trigger a transition from the low power state to a higher power state (e.g., where rendering to the display resumes). In such examples, one or more types of sensors (e.g., an accelerometer, a gyroscope, a contact sensor, a Hall-effect sensor, etc.) in a wing and/or a center panel may be utilized to generate a signal that can be utilized by an operating system.

As an example, the device 100 can include the hinge assemblies 500 and 700 as including minimum and maximum radii of curvature, which may correspond to angles of approximately 0 degrees (e.g., or slightly less) and approximately 180 degrees (e.g., or less). At the minimum, the device 100 may be in the closed orientation 100 where the minimum radius of curvature provides space sufficient to accommodate the base housing 160. For example, the base housing 160 can be of a thickness that is less than or equal to approximately twice the minimum radius of curvature (see, e.g., the closed orientation 102 in FIG. 5, the schematic diagram 903 of FIG. 9, etc.).

The example of FIG. 9 also shows various other features that provide for coupling of the link assemblies 1100-1 and 1100-2 as well as individual links of the link assemblies 1100-1 and 1100-2.

Figure 10:
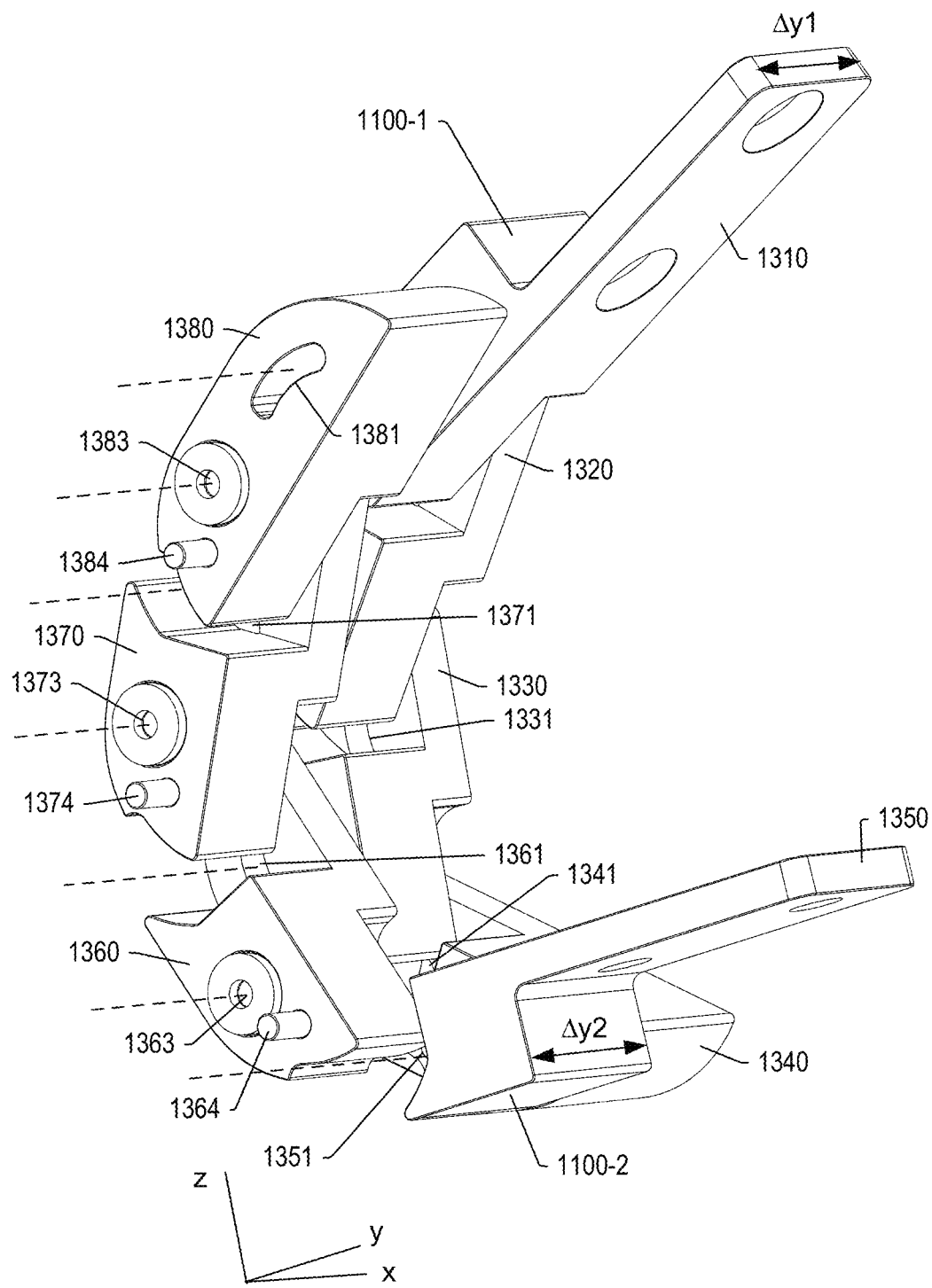
FIG. 10 is a perspective view of an example of a hinge assembly.

FIG. 10 shows a perspective view of the link assemblies 1100-1 and 1100-2 in a side-by-side arrangement, where they are operatively coupled. FIG. 10 also shows a Cartesian coordinate system (x, y and z) that may be utilized to describe one or more features of the link assemblies 1100-1 and 1100-2. For example, the link assembly 1100-1 can have a dimension Δy1 and the link assembly 1100-2 can have a dimension Δy2 where Δy1 and Δy2 may be approximately the same. As an example, for a device such as the device 100 of FIG. 1, the Cartesian coordinate system may be compared to the Cartesian coordinate system of FIG. 1 (e.g., for the wing 600 with respect to the center panel 400). The link assembly 1100-1 includes the links 1310, 1320, 1330 and 1340 and the link assembly 1100-2 includes the links 1350, 1360, 1370 and 1380. Thus, each of the link assemblies 1100-1 and 1100-2 includes four links where, as mentioned, one of the links is an end link (see the end links 1310 and 1350).

FIG. 10 also shows seven axes of the seven bores 1110-1 to 1100-7 shown in FIG. 9. As shown, the link 1380 includes a curved slot 1381 that can receive a rod (e.g., one of the rods 1200-1 to 1200-M) and a bore 1383 that can receive a rod (e.g., one of the rods 1200-1 to 1200-M).

As shown in FIG. 10, the link 1330 includes a curved slot 1331 that can receive a rod, the link 1340 includes a curved slot 1341 that can receive a rod, the link 1350 includes a curved slot 1351, the link 1360 includes a curved slot 1361 that can receive a rod and a bore 1363 that can receive a rod, the link 1370 includes a curved slot 1371 that can receive a rod and a bore 1373 that can receive a rod, and the link 1380 includes a curved slot 1381 that can receive a rod and a bore 1383 that can receive a rod. In the example of FIG. 10, the link 1320 can include a curved slot; however, the end link 1310 can be without a curved slot (e.g., it can include a bore and no curved through slot).

FIG. 10 also shows the link 1360 as including a peg 1364, the link 1370 as including a peg 1374, and the link 1380 as including a peg 1384. The pegs 1364, 1374 and 1384, if present, can be inter link assembly pegs that can be received in curved slots of another link assembly. For example, the link assembly 1100-1 includes inter link assembly pegs (see FIG. 11) that are received in the curved slots 1361, 1371 and 1381.

Figure 11:
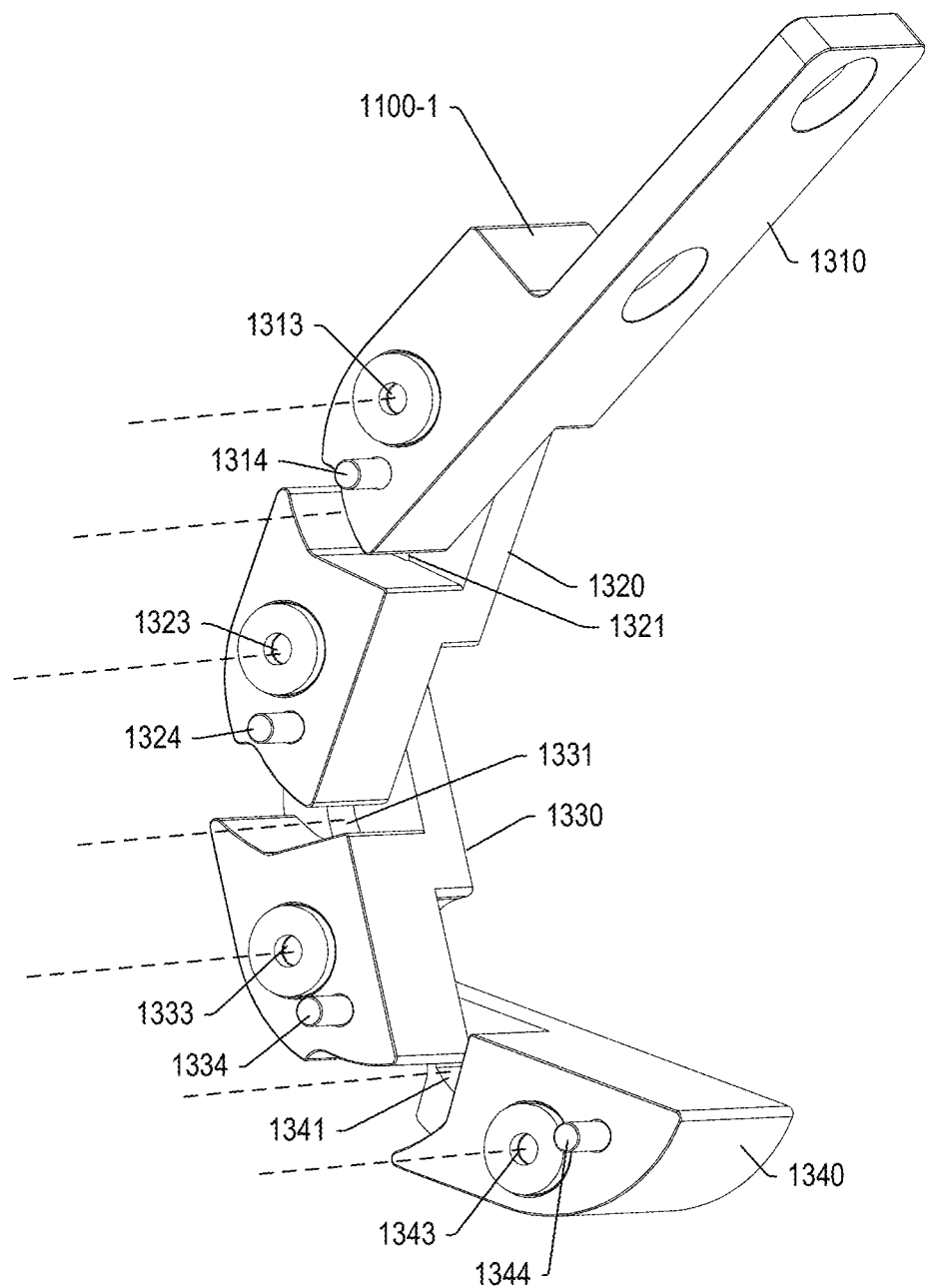
FIG. 11 is a perspective view of an example of a portion of the hinge assembly of FIG. 10.

FIG. 11 shows the link assembly 1100-1 as shown in FIG. 10, where the link 1310 includes a bore 1313 that can receive a rod, the link 1320 includes a curved slot 1321 that can receive a rod and a bore 1323 that can receive a rod, the link 1330 includes a curved slot 1331 that can receive a rod and a bore 1333 that can receive a rod, and the link 1340 includes a curved slot 1341 that can receive a rod and a bore 1343 that can receive a rod. As mentioned, the link assembly 1100-1 can include pegs, which are shown in FIG. 11 as pegs 1314, 1324, 1334 and 1344. As explained, these can be inter link assembly pegs that are received in through slots (e.g., curved through slots) of another, adjacent link assembly (see, e.g., the curved slots 1351, 1361, 1371, and 1381 of FIG. 10).

Figure 12:
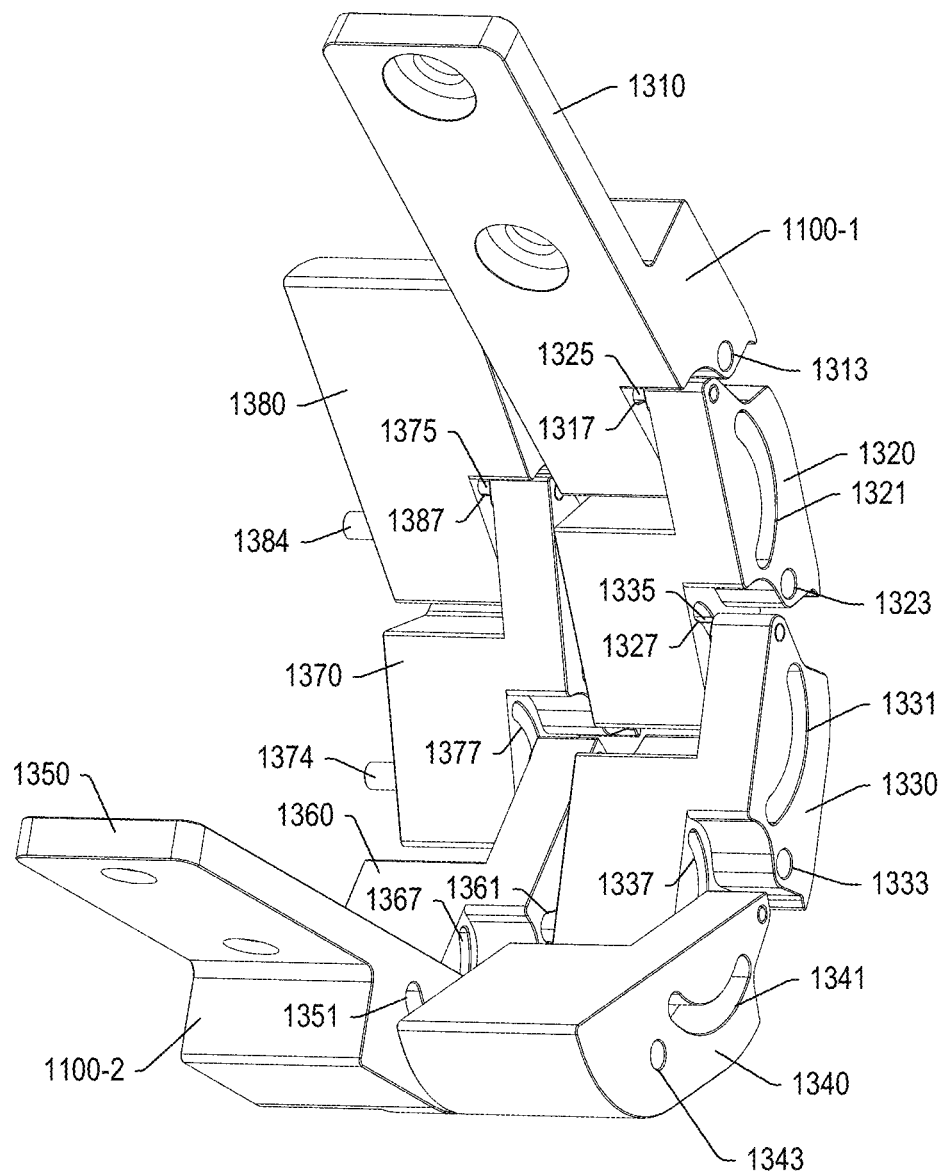
FIG. 12 is another perspective view of the example of the hinge assembly of FIG. 10.

FIG. 12 shows another perspective view of the pair of link assemblies 1100-1 and 1100-2 and their respective links 1310, 1320, 1330 and 1340 and 1350, 1360, 1370 and 1380, respectively.

FIG. 12 also shows guide slots 1317, 1327, 1337, 1367, 1377 and 1387 of the links 1310, 1320, 1330, 1360, 1370 and 1380, respectively. The guide slots 1317, 1327 and 1337 can be intra link assembly features of the link assembly 1100-1 for the links 1310, 1320, 1330 and 1340 and the guide slots 1367, 1377 and 1387 can be intra link assembly features of the link assembly 1100-2 for the links 1350, 1360, 1370, and 1380 that cooperate with pegs where a peg 1325 of the link 1320 is visible in the guide slot 1317, a peg 1335 of the link 1330 is visible in the guide slot 1327 and where a peg 1375 of the link 1370 is visible in the guide slot 1387.

Figure 13:
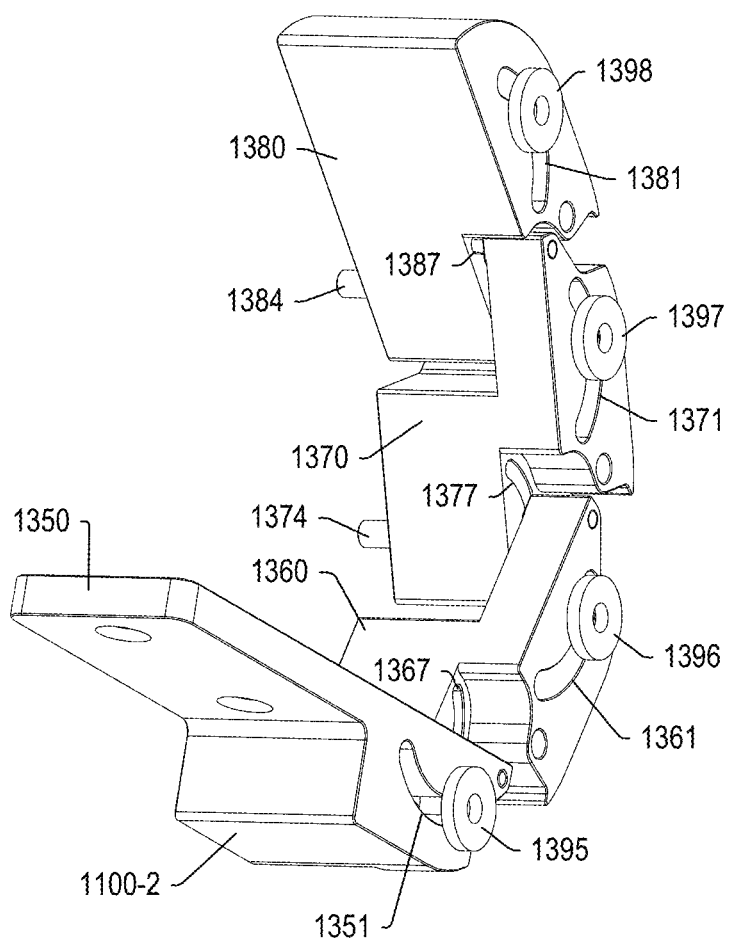
FIG. 13 is a perspective view of an example of a portion of the hinge assembly of FIG. 12.

FIG. 13 shows a perspective view of the link assembly 1100-2 and its links 1350, 1360, 1370 and 1380, along with washers 1395, 1396, 1397 and 1398, which may be intermediate parts, for example, received in part in links of the link assembly 1100-1 and/or the link assembly 1100-2 or otherwise disposed therebetween. As shown in FIG. 13, the curved slots 1351, 1361, 1371 and 1381 (e.g., inter link assembly features) are visible along with the guide slots 1367, 1377 and 1387 (e.g., intra link assembly features).

Figure 14A:
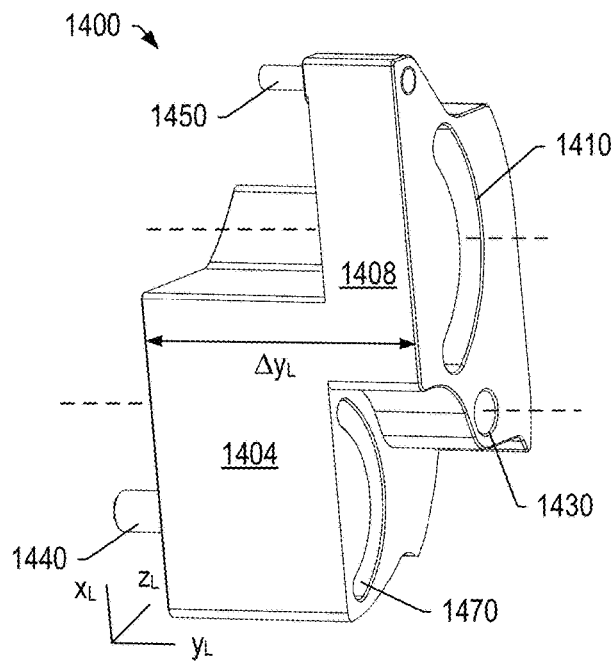
FIG. 14A, FIG. 14B, FIG. 14C and FIG. 14D are perspective and side views of an example of a link.
Figure 14B:
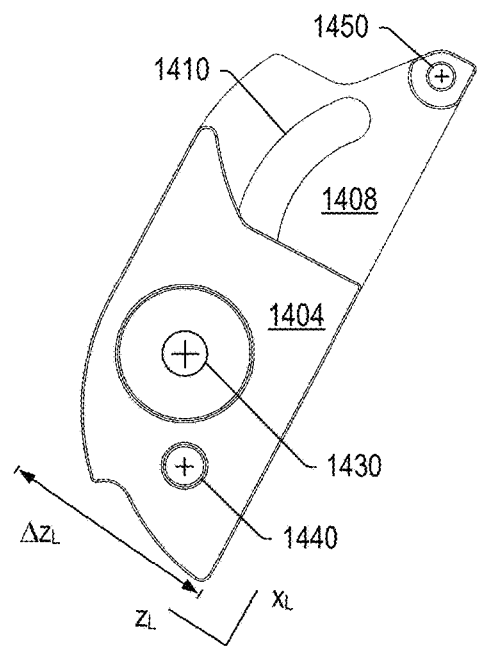
Figure 14C:
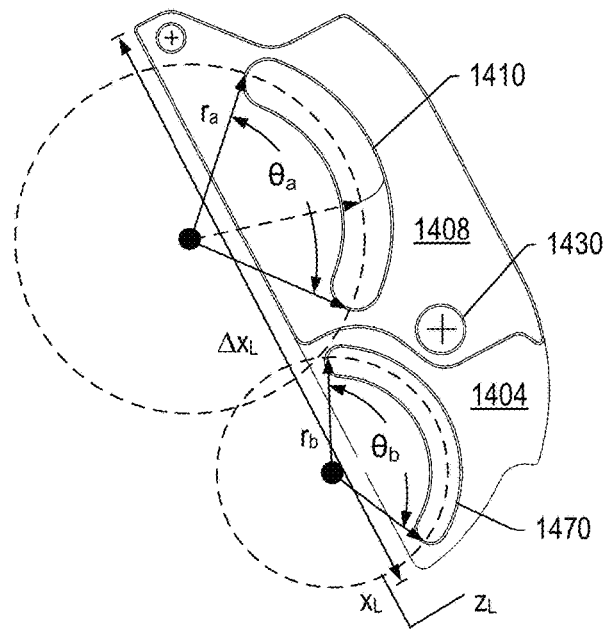
Figure 14D:
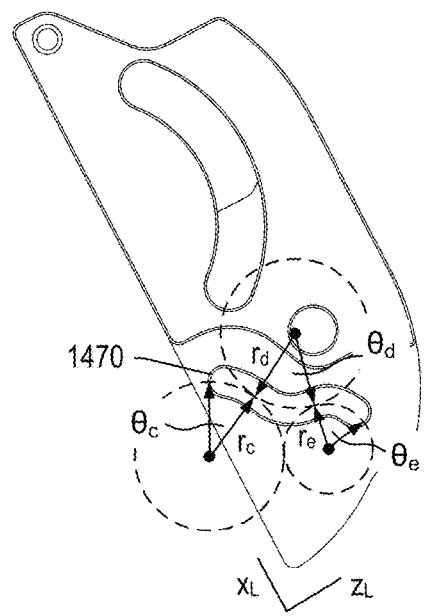

FIG. 14A shows a perspective view of a link 1400, which may be an intermediate link, FIG. 14B shows a side view of the link 1400 and FIG. 14C and FIG. 14D show another side view of examples of an opposing side of the link 1400, where a Cartesian coordinate system ($x_L$, $y_L$, and $z_L$) is also shown.

FIG. 14A shows a curved slot 1410, a bore 1430, pegs 1440 and 1450 and a curved guide slot 1470. As shown, the curved slot 1410 is partially closed to one side such that a rod can move only within a fully open portion of the curved slot 1410. In the example of FIG. 14A, the curved guide slot 1470 can receive a peg of another link such as the peg 1450 of another link, while the partially closed portion of the curved slot 1410 can receive a peg of another link such as the peg 1440 of another link. As shown in the example of FIGS. 14A, 14B, 14C and 14D, the curved guide slot 1470 is closed in that it is not a through slot; whereas, the curved slot 1410 is, in part, a through slot. As explained, the curved slot 1410 can receive a rod and the bore 1430 can receive a rod. Thus, the curved slot 1410 can receive a rod and a peg. Thus, the curved slot 1410 can receive two components, both of which may be cylindrical in shape (e.g., a cylindrical rod and a cylindrical peg).

As shown in FIGS. 14A, 14B, 14C and 14D, the link 1400 can include two portions 1404 and 1408 and a jog between the portions 1404 and 1408, which may be defined by offset planar surfaces of the two portions 1404 and 1408. Such a jog can provide for nesting of links. For example, FIG. 12 shows nesting of the links 1310 and 1320, the links 1320 and 1330, and the links 1330 and 1340 along with nesting of the links 1350 and 1360, the links 1360 and 1370 and the links 1370 and 1380. In the example of FIG. 12, the width of the pair of link assemblies 1100-1 and 1100-2 is approximately the width of two links; noting that a washer or washers may be disposed at least in part between two links where a washer or washers may provide for a clearance such that flat side surfaces of the link assembly 1100-1 and 1100-2 do not directly contact each other, for example, to reduce wear, friction, etc., where friction may be controllable via clamping force that acts to clamp the pair of link assemblies 1100-1 and 1100-2, optionally along with additional link assemblies.

As an example, one or more of the curved slots 1410 and 1470 may be shaped as an arc or may be of another shape, which may include one or more arc portions. For example, the curved guide slot 1470 may, for one or more links, have a different shape than the arc shown in FIG. 14A and FIG. 14C. FIG. 14D shows an example of an alternative shape of the curved guide slot 1470 (see, e.g., FIG. 9).

As to dimensions and features, the link 1400 has a body width $\Delta y_L$ where the peg 1440 extends a distance from the body, a body length $\Delta x_L$, and a body height $\Delta z_L$. The peg 1450 is within the body width and extends from the portion 1408, which as mentioned can be received in a curved guide slot of another link (e.g., in a nested arrangement of adjacent links). As shown, the pegs 1440 and 1450 can differ in cross-sectional area, for example, the peg 1450 can be of a lesser cross-sectional area than the peg 1440 (e.g., consider the peg 1450 as being defined by a smaller diameter, etc.). FIG. 14C shows the curved slot 1410 as being composed of an open or through portion and a closed portion where an arc span can be defined by a radius $r_a$ and an arc angle $\theta_a$ where the closed portion is a fraction of that arc angle. FIG. 14C also shows the curved guide slot 1470, which can be defined at least in part by a radius $r_b$ and an arc angle $\theta_b$. As mentioned, a guide slot may be of a different shape depending on how an assembly is to move while transitioning between positions. In the example of FIG. 14C, the radius of the curved guide slot 1470 is less than the radius of the curved slot 1410. In the example of FIG. 14D, the shape of the curved guide slot 1470 may be defined using arc lengths, for example, an arc length with a radius $r_c$ and arc angle $\theta_c$, an arc length with a radius $r_d$ and arc angle $\theta_d$, and an arc length with a radius $r_e$ and arc angle $\theta_e$.

As shown, the bore 1430 is positioned at an $x_L$ position that is within the $x_L$ range of the curved guide slot 1470. The position of the bore 1430 may be defined by a bore center or axis at a position specified by $x_L$, $z_L$ coordinates. As explained, the bore 1430 can receive a rod and the curved slot 1410 can receive a rod. Additionally, the curved slot 1410 can receive a peg of another link where the rod and the peg as received in the curved slot 1410 can define a virtual axis that can be offset toward the concave side of the curved slot 1410 (e.g., optionally outside the portion 1408).

As shown and explained, various link features may be intra link assembly features or inter link assembly features. For example, the peg 1450 and the curved guide slot 1470 can be intra link assembly features while the peg 1440 and the curved slot 1410 can be inter link assembly features. As explained, intra link assembly features may be nesting features where the portion 1408 can nest with a portion 1404 of another link and where the portion 1404 can nest with a portion 1408 of yet another link. Thus, the link 1400 is shown as an intermediate link that can link to two other links in a link assembly while also being able to couple to another link assembly. For example, the curved slot 1410 can receive a peg 1440 of another link assembly and/or the peg 1440 can be received in a curved slot 1410 of another link assembly.

Figure 15:
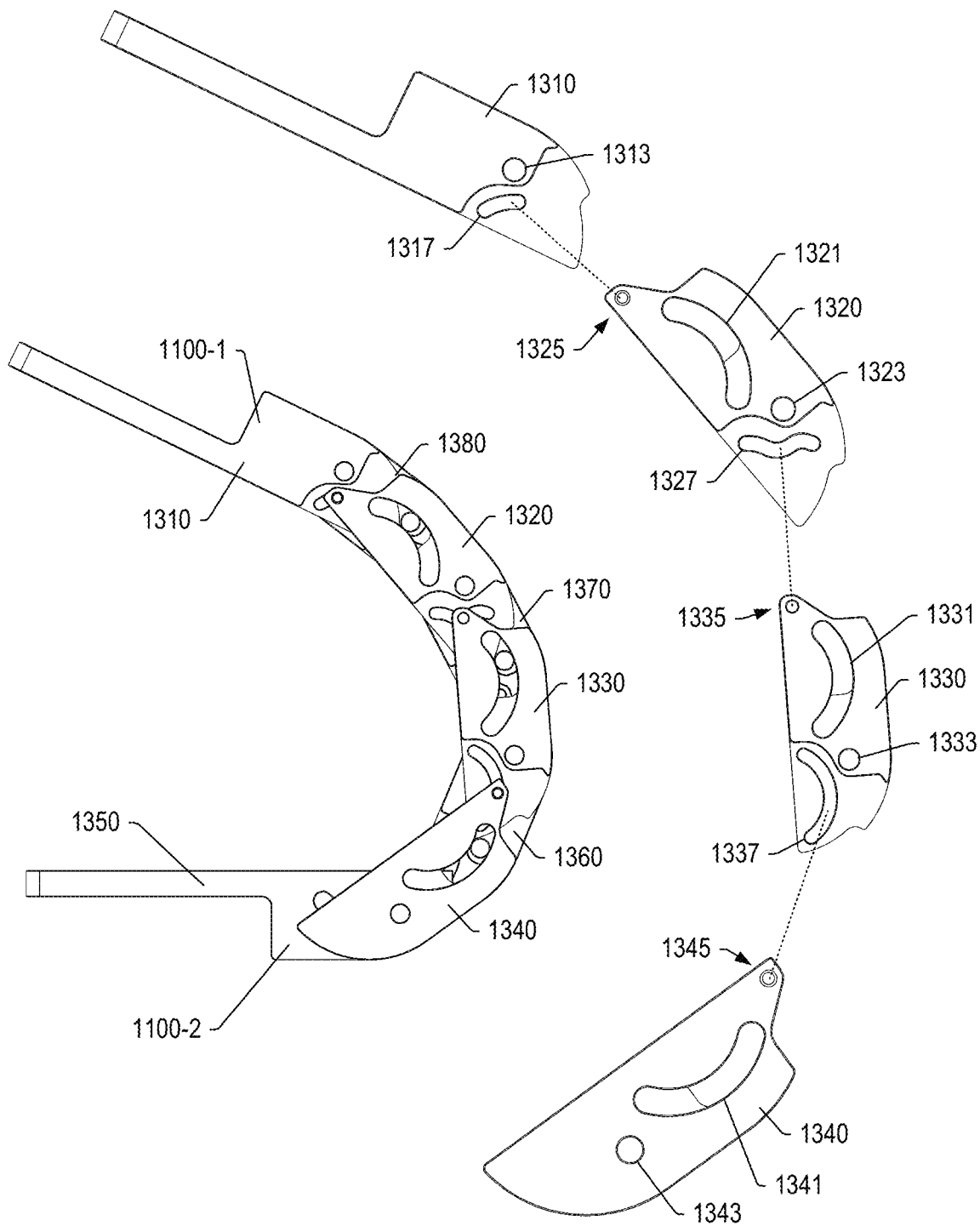
FIG. 15 is a side view of an example of a hinge assembly and an exploded side view of a portion of the hinge assembly.

FIG. 15 shows a side view of the links 1310, 1320, 1330, 1340, 1350, 1360, 1370 and 1380 as assembled and an exploded side view of the links 1310, 1320, 1330 and 1340 along with dotted lines to indicate cooperating features (e.g., intra link features). As shown, the link 1310 includes the bore 1313 and the guide slot 1317, the link 1320 includes the curved slot 1321, the bore 1323, the peg 1325, and the guide slot 1327, the link 1330 includes the curved slot 1331, the bore 1333, the peg 1335 and the guide slot 1337, the link 1340 includes the curved slot 1341, the bore 1343 and the peg 1345. As indicated by the dotted lines, the peg 1325 is received in the guide slot 1317, the peg 1335 is received in the guide slot 1327, and the peg 1345 is received in the guide slot 1337 (e.g., intra link assembly features of nesting link portions).

As explained, shapes of one or more guide slots may provide for desirable movements. In the example of FIG. 15, the guide slot 1317 is curved and arcuate with an arc angle of approximately 90 degrees and relatively short in comparison to the guide slot 1337, which is curved and arcuate with an arc angle of approximately 180 degrees. The guide slot 1327 has a different shape, which may be a shape such as the shape of the guide slot 1470 of FIG. 14D, which can include changes in curvature, etc.

Referring to the orientation 1002 of FIG. 9, the peg 1335 is received in the guide slot 1327 at or proximate to an upper end of the guide slot 1327; whereas, in the orientation 1004 of FIG. 9, the peg 1335 is received in the guide slot 1327 at or proximate to a mid-point of the guide slot 1327. In transitioning from the orientation 1002 to the orientation 1004, the peg 1335 moves in a somewhat straight direction, which can provide for elongation of the circle shown with respect to the orientation 1002 to the more oval shape shown with respect to the orientation 1004. In such an example, there can be some amount of vertical lift available for the top portion as shown in the schematic diagrams 902 and 904 (e.g., consider transitioning of the peg 1335 from the orientation 1002 to the orientation 1004 or vice versa).

Figure 16:
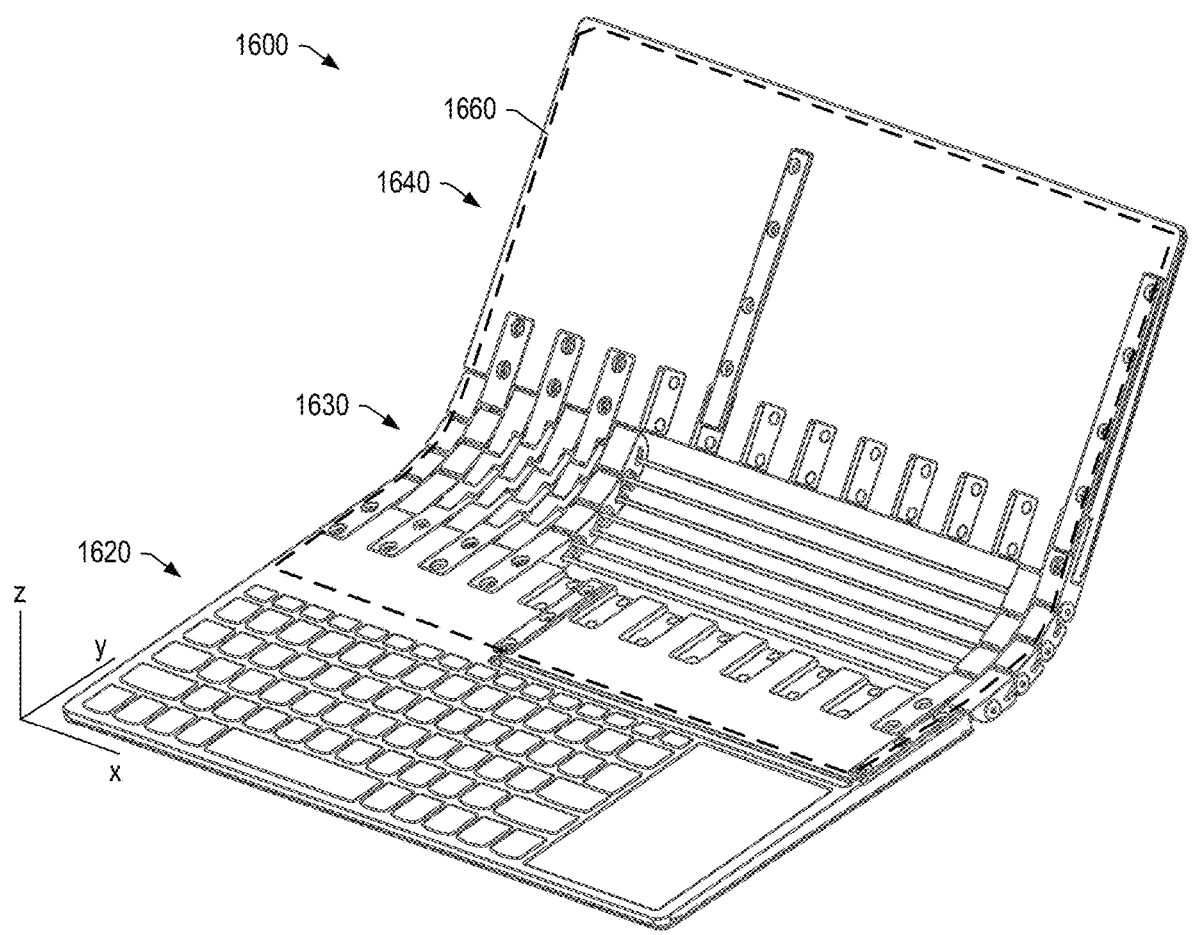
FIG. 16 is a perspective view of an example of a device.

FIG. 16 shows an example of a device 1600 that includes a portion 1620, a hinge assembly portion 1630 and a portion 1640. As an example, the device 1600 can include a continuous bendable display 1660 (see dashed line) that covers the portion 1640 and at least part of the hinge assembly portion 1630 where the hinge assembly portion 1630 provide for bending of the continuous bendable display 1660 (e.g., a continuous foldable display). The device 1600 may include one or more features of the device 100 of FIG. 1, for example, one or more processors, memory, one or more network interfaces, one or more power supplies (e.g., one or more batteries, etc.). FIG. 16 also shows a Cartesian coordinate system with x, y and z-axes, where the hinge assembly portion 1630 includes rods that extend substantially parallel to the x-axis (see, e.g., the hinge assembly 1000 of FIG. 8). As shown, the hinge assembly portion 1630 includes active link assemblies and dummy link assemblies.

As mentioned, rods may span one or more sets of link assemblies and may be utilized to compress link assemblies such that a desired amount of friction is achieved such that the hinge assembly portion 1630 can maintain a positional relationship between the portions 1620, 1630 and 1640, which may be defined by an angle between the portion 1620 and the portion 1640.

As an example, the hinge assembly portion 1630 may provide a relatively constant curvature for the continuous bendable display 1660 over a bent (e.g., curved) portion of the continuous bendable display 1660. In such an approach, where the continuous bendable display 1660 is a laminated structure, a relatively constant curvature may help to reduce risk of delamination (e.g., separation of layers, etc.). For example, when a structure is transitioned from one shape to another, one side may experience compression that may change and an opposing side may experience tension that may change. In such an example, a neutral plane may exist between a plane that is in compression and a plane that is in tension.

Figure 17A:
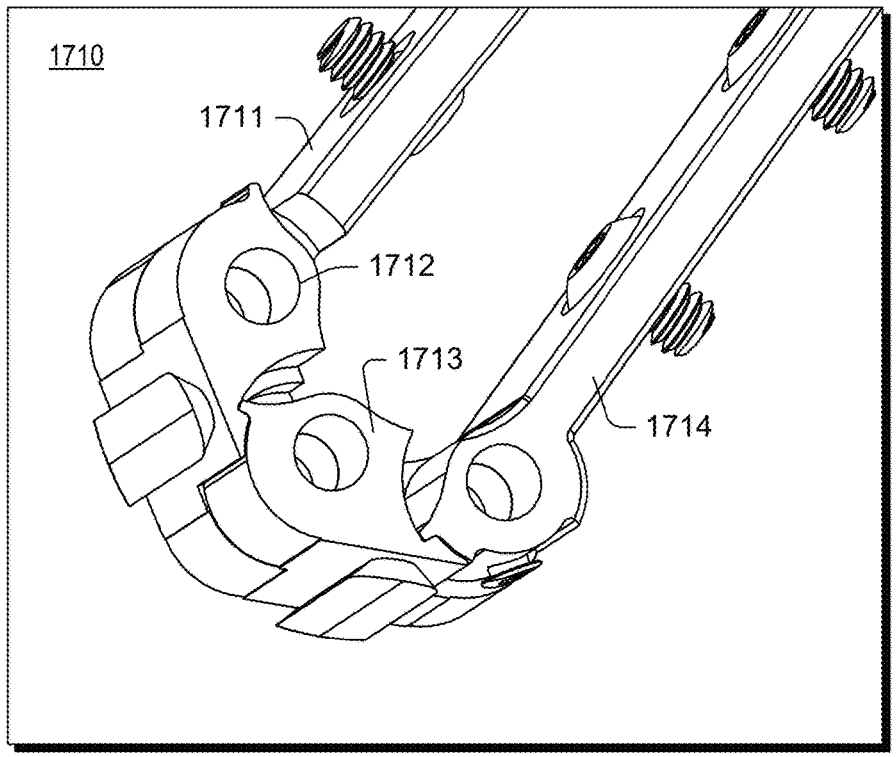
FIG. 17A, FIG. 17B and FIG. 17C show examples of hinge assemblies.
Figure 17B:
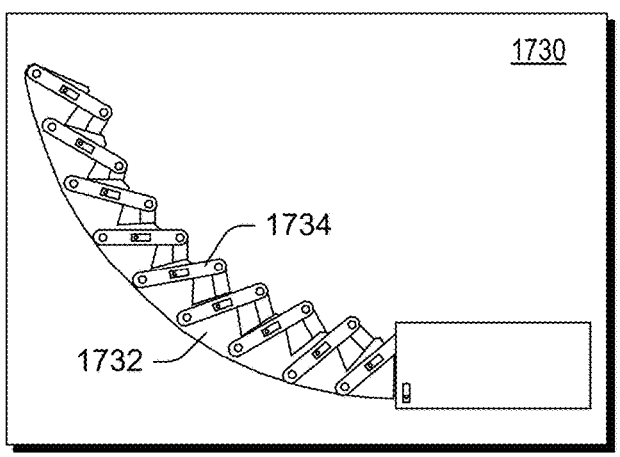
Figure 17C:
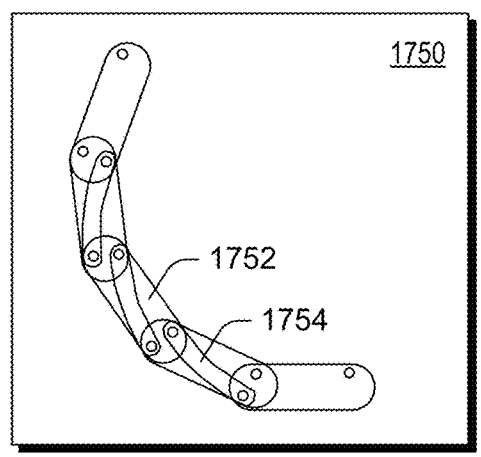

FIG. 17A, FIG. 17B and FIG. 17C show various examples of hinge assemblies 1710, 1730 and 1750, which may be utilized in a device such as the device 100, the device 1600, etc.

As shown, the hinge assembly 1710 includes links 1711, 1712, 1713 and 1714 where the links 1711 and 1714 are end links. The hinge assembly 1710 can be characterized by a radius of curvature that may define in part a recess where the recess may be utilized for receiving a housing.

As shown, the hinge assembly 1730 can include a flexible back bone 1732 that supports a scissoring assembly 1734.

As shown, the hinge assembly 1750 can include main links 1752 and guide links 1754 where the guide links 1754 control movement of the main links 1752.

As an example, a hinge assembly can provide a shape that is suitable for a bendable display when the hinge assembly is in a closed orientation. In such an example, the shape may be sufficient to define in part a recess where a housing can be received at least in part in the recess. For example, in FIG. 1, a continuous, bendable display can span the wings 600 and 800 and the center panel 400 where the hinge assemblies 500 and 700 provide a space to accommodate the continuous, bendable display at its bends, which may be specified by a manufacturer using a minimum bend radius.

As an example, a bendable display can be a flexible OLED technology display where a substrate can be polymeric such as, for example, polyimide. As an example, an overall thickness of a film stack of layers including OLEDs can be of the order of several millimeters or less. For example, consider layers such as a thin-film transitory (TFT) layer on a foldable substrate; an insulating layer covering the TFT; an OLED on the insulating layer; an encapsulation layer on the substrate; a flexible touch screen panel bonded to the encapsulation layer; and a hard coat cover window film that maintains the optical properties of a display film while providing some resistant to scratches, abrasions and impacts.

As an example, when bending a stack of layered films, there can be a location in the stack that may be a neutral axis, or neutral bending plane, where there can be effectively zero strain. As an example, a bendable display can include a display module that is located at or near the neutral plane to help reduce strains and stresses experienced by the display module. Where a layered bendable display is utilized, too much compressive stress on an inward bend can result in buckling and delamination, while excessive tensile stress can result in cracking and delamination. While each element in the display stack can bend to relatively tight radii (e.g., consider less than approximately 15 mm) as an independent thin film, when elements are bonded together with adhesion and then bent, mechanical stress can be transferred between the bonded elements, which may increase risk of delamination, buckling, etc., because of tensile force and/or compressive force present in the stack.

As an example, a hinge assembly may provide for a display radius of approximately 5 mm to 20 mm when closed and may provide for a display radius of approximately 40 mm to approximately 80 mm when open to approximately 120 degrees (e.g., consider a wing with respect to a center panel, portions of a device, etc.). As an example, a hinge assembly may provide for a constant curvature throughout a bending zone (e.g., a bending region). For example, corners of various devices can have rounded corners that when examined closely are shown to have fillets that slowly blend into edges rather than a constant curvature. As an example, curvature combs may be utilized to illustrate curvature and to determine whether or not or to what extent it is, is not or is approximately constant. Such combs can be of a longer length (e.g., teeth) for greater curvature. For example, a circle would have curvature combs of equal length about the entire circumference (e.g., perimeter) of the circle; whereas, for an ellipse with unequal major and minor axes lengths, the lengths of the curvature combs will change.

As an example, curvature in multiple dimensions can be defined as different curvature categories, including contact ($C^0$), tangency ($C^1$) and curvature ($C^2$) where curvature combs may be utilized (e.g., to illustrate transitions between surfaces). As an example, $C^0$ may correspond to a connection without tangency (e.g., an edge), $C^1$ may correspond to a tangent connection and $C^2$ may correspond to a curve continuous connection. As an example: $C^0$ may represent just touching; $C^1$ may represent tangent, which could possibly include a sudden change in curvature; and $C^2$ may represent continuous curvature.

As mentioned, a hinge assembly may provide for opening to 180 degrees or less or, for example, slightly more than 180 degrees (e.g., between 180 degrees and 200 degrees).

As an example, a hinge assembly may meet one or more criteria such as one or more of the following: (a) at all reasonable usage angles, the transition of the display from the vertical to horizontal sections is smooth (e.g., constant curvature); (b) throughout articulation, the inside surface of the hinge assembly is to maintain an approximately constant length such that relative motion is minimal between a display the hinge assembly; and (c) where a minimum display radius is, for example, approximately 40 mm at 120 degrees and a maximum radius is, for example, approximately 10 mm when closed, a portion of the hinge section that is actually bending can be required to change length, depending on the open angle. As explained, a hinge assembly can include various features that can define shape or shapes of a hinge assembly during operation. As an example, one or more features may provide for a length change. For example, consider the orientations 1002 and 1004 of FIG. 10 where the shape of a guide slot can be tailored for one or more purposes, which may include allowing for a length change (see, e.g., the guide slot 1470 of FIG. 14D, the guide slot 1327 of FIG. 15, etc.).

As an example, the pair of link assemblies 1100-1 and 1100-2 can provide an extension of a link to reach past an adjacent link to engage a cam path in the following link, which synchronizes the relative joint angles. For example, consider the pegs 1325, 1335 and 1345 of FIG. 15 to be extensions and the guide slots 1317, 1327 and 1337 to be cam paths. For example, a peg can be an extension and a guide slot can be a cam path. As an example, a guide slot/cam path geometry can ensure constant curvature or can drive a reversal of rotation in some links to achieve a greater bend radius difference between open and closed orientations (e.g., positions).

Referring to FIGS. 17A, 17B and 17C, various features may be utilized to define paths and curvatures. In the example hinge assembly 1710, various contact surfaces are shown that can define minimum and/or maximum positions. In the example hinge assembly 1730, stacked, asymmetric scissors can bend along a flexible backbone as they extend where such an approach may be tuned to different curvatures and where asymmetry can provide for bias of a neutral bending curve. In the example hinge assembly 1750, the guide links 1754 between non-adjacent main links 1752 can communicate relative motion of one pair of the main links 1752 to the next.

As an example, a hinge assembly can include pivots that are implemented as pins in slots, with a virtual pivot point that can be external to the hinge assembly and as close as possible to a neutral bending plane of a bendable display. In such an example, the surface of the hinge assembly adjacent to the bendable portion of the bendable display may maintain its effective length during articulation. For example, referring again to FIG. 9, consider the dotted line representing the continuous, bendable display 1001 as being aligned with a neutral bending plane. As shown, the dotted line is external to the actual pivot points of the pair of link assemblies 1100-1 and 1100-2. In other words, the pair of link assemblies 1100-1 and 1100-2 provide for virtual pivot points. As explained, the curved slots can include a rod and a peg, which can be considered pins such that two pins are received by a single curved slot, which can result in a virtual pivot point that can be exterior to the single curved slot and external to components of a hinge assembly.

As an example, a hinge assembly can provide for handling an arc length change generated by enforcing different bend radii at distinct display angles. For example, consider a 10 mm bend radius at 190 degrees wrap angle as having a 33.2 mm arc length and a 40 mm bend radius at 60 degrees wrap angle as having a 41.9 mm arc length.

Figure 18:
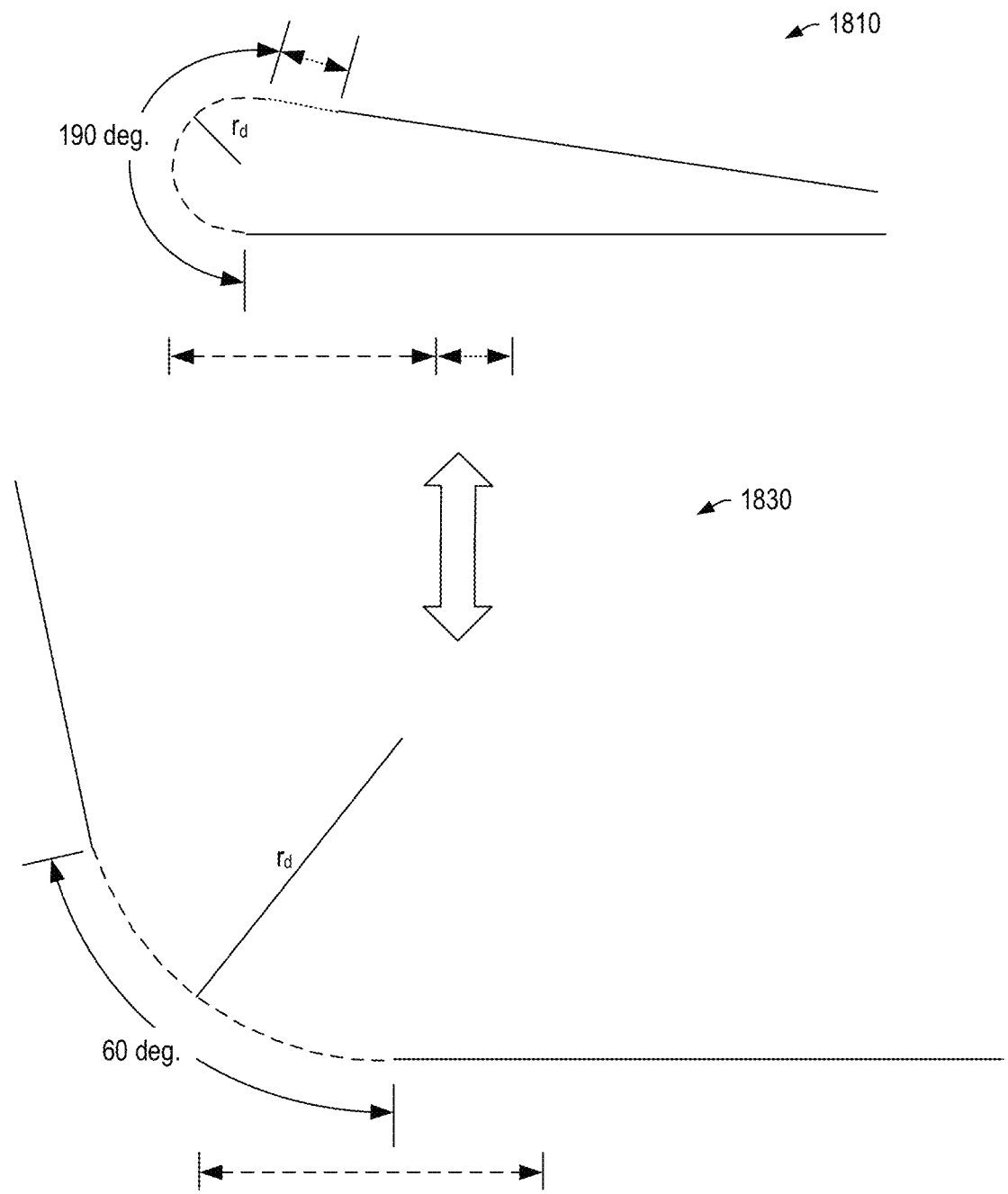
FIG. 18 is a series of side views of orientations of a device.

FIG. 18 shows an example orientation 1810 with a 190 degree wrap angle and an example orientation 1830 with a 60 degree wrap angle. In the examples of FIG. 18, the bend radii, $r_d$, may be at a ratio of approximately 4 to 1, where the radius for the orientation 1830 is approximately four times that of the orientation 1810. As shown, the arc length is less for the smaller bend radius of the orientation 1810 when compared to the arc length of the orientation 1830. As such, a variable length may be provided by a hinge assembly to account for the differences in arc length with respect to bend radius. As shown in the examples of FIG. 18, the bend region can be defined by an arc of a circle such that the bend region is at a relatively constant curvature. As an example, a hinge assembly may be structured and arranged to provide a theoretically constant curvature where, due to mechanical specifications, stack-up, etc., the actual may provide for a relatively constant curvature.

As an example, a hinge assembly can include one or more end links that are straight and virtual pivots that keep a hinge length constant. In such an example, in the closed orientation, some number of links may reverse their curvature and go straight, allowing the remaining links to close to a tighter angle. For example, consider the shape of the guide slot 1327 of the link 1320 of FIG. 15. As shown, the shape of the guide slot 1327 can include one or more inflection points, etc., where curvature is reversed.

As an example, a hinge assembly can include one or more telescoping ends. For example, consider a hinge with regular pivots that provide an effective reduction in length when closed. Such a reduction may be countered with telescoping elements that extend the hinge linearly relative to fixed elements.

As to reversing features of a hinge assembly, as an example, by increasing the number of reversing links, a ratio of closed radius to a 60 degree open wrap angle radius can be increased, allowing for a smaller closed radius or a larger open radius. In such an example, the relationship between arc length and radius of curvature can be addressed by bending only the portion of the mechanism that is required for a given orientation, while the rest of the mechanism remains unbent. As an example, consider a hinge assembly with five bending links and two reversing links and a hinge assembly with four bending links and four reversing links. In such an example, both may be able to achieve a closed orientation with an angle of minus 10 degrees between top and bottom portions with a radius of approximately 10 mm; however, the latter may provide for an increased radius at a 60 degree wrap angle compared to the former (e.g., approximately 79 mm to approximately 47 mm).

As an example, a hinge assembly may be of a thickness that is less than approximately 20 mm, less than approximately 15 mm, or less than approximately 10 mm. As an example, a continuous, bendable display may have a radius of approximately 10 mm when in a closed orientation and a radius of approximately 50 mm when open to a 120 degrees wrap angle. As an example, a hinge assembly may provide for opening to 180 degrees (e.g., flat or planar).

As an example, a hinge assembly can include a number of sets of active elements that define motion along with a number of dummy elements that follow the motion defined by the active elements where the dummy elements can provide support for a display outside of an active zone.

As an example, an active element can be a pair of link assemblies, which may include 8 individual links arranged in 2 rows of 4. In such an example, each 8-link assembly can include 7 virtual pivots defined by a semicircular slot engaged by 2 pins (e.g., a rod and a peg). In such an example, of the 2 pins, one can be local to the link pair (e.g., a peg) while the other extends an entire width of a hinge assembly (e.g., a rod), for example, to keep the motion well-defined across the width of the hinge assembly and to provide an ability to apply an axial load (e.g., rod tension), which may be utilized to add friction (e.g., friction force to the hinge assembly).

While dummy elements are mentioned, one or more other types of components may be utilized, which may include resilient material that can conform to suitable shapes during transitions. As an example, such material may provide for an amount of friction, an amount of stability, etc. As an example, one or more spring elements may be included in a hinge assembly, which may be for providing a biasing force, load balancing, preload, etc. As an example, one or more locator elements may be utilized to help guide a continuous, bendable display with respect to a hinge assembly. For example, consider one or more spacers that aim to support a display at a virtual pivot or virtual pivots. As an example, a hinge assembly may be disposed at least in part to one or more opposing sides of a display such that the display can follow its own curvature without providing virtual pivots. For example, consider side link assemblies that are disposed at a width that can accommodate a display therebetween such that the link assemblies can utilize a non-virtual pivot approach.

Figure 19:
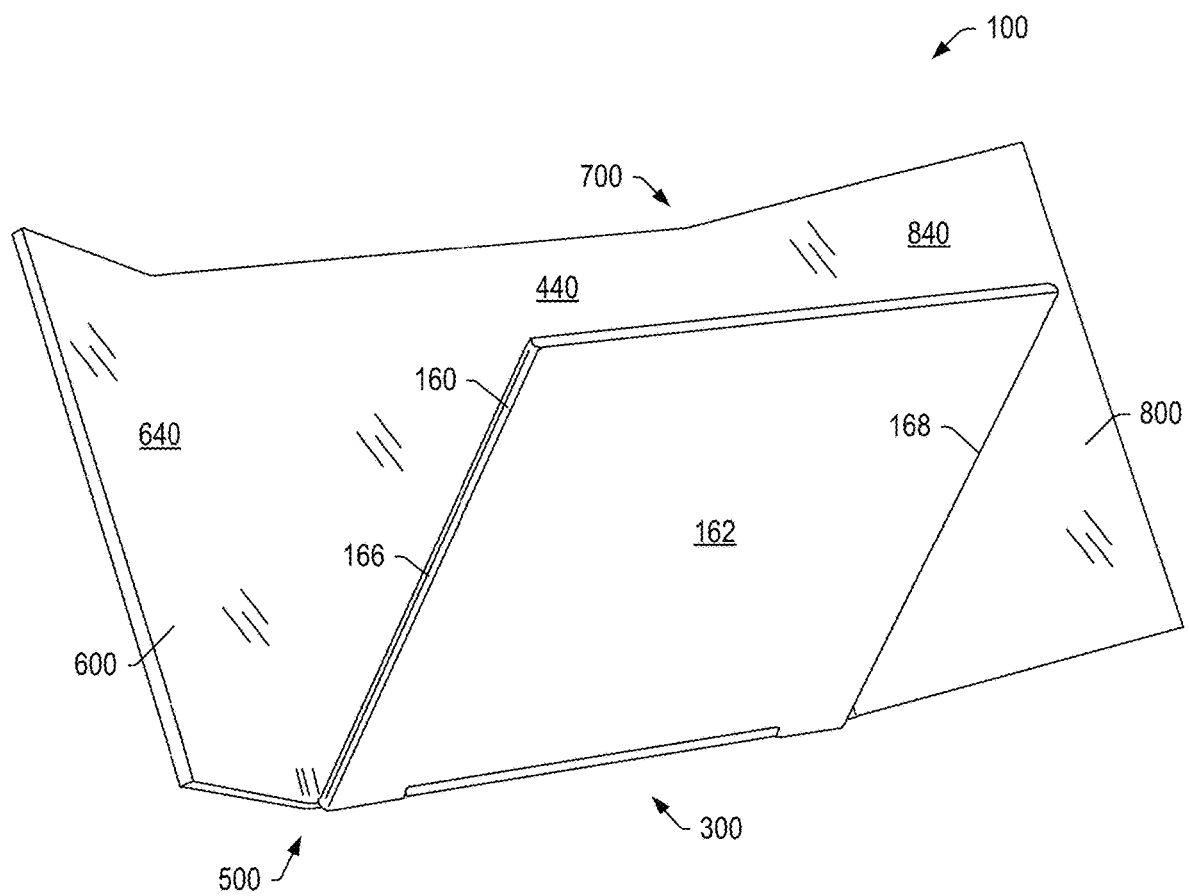
FIG. 19 shows a perspective view of an example of a folding device.

FIG. 19 shows an example of the device 100 as a folding device that includes the base housing 160; a display housing 140 that includes the center panel 400 and the folding wings 600 and 800 that fold over the center panel 400 to form a recess for the base housing 160; and a hinge assembly 300 that couples the display housing 140 to the base housing 160. As shown, the device 100 can include the hinge assemblies 500 and 700, which, for example, may include one or more features of one or more of the hinge assembly 1000, 1710, 1730 and 1750. As shown in FIG. 19, the device 100 can include three hinge assemblies, which can provide for transitioning the device 100 from a folded orientation to an open orientation.

As an example, an apparatus can include a processor; memory accessible to the processor; a base housing; a display housing that includes a center panel and folding wings that fold over the center panel to form a recess for the base housing; and a hinge assembly that couples the display housing to the base housing. In such an example, the display housing can include a continuous display that extends across the center panel and at least one of the folding wings. As an example, a continuous display can extend across a center panel and two folding wings. As an example, an apparatus can include a center panel display, a first folding wing display and a second folding wing display. As an example, an apparatus can include a continuous center panel and first folding wing display and a second folding wing display.

As an example, an apparatus can be oriented in various orientations, which can include a closed orientation where a base housing is disposed in a recess formed by a center panel and folding wings, an intermediate orientation and an open orientation, where, in the intermediate orientation, the folding wings are open to define a clearance for rotation of the base housing via a hinge assembly.

As an example, in a closed orientation, a base housing can be disposed in a recess formed by a center panel and folded wings of a display housing and, in an intermediate orientation, the wings can be open (e.g., at least partially unfolded) to define a clearance for rotation of the base housing via a hinge assembly that couples the display housing and the base housing.

As an example, in a closed orientation, a clearance can exist between the center panel and the folding wings, where a thickness of the base housing is less than or equal to the clearance. For example, a height of the recess can be greater than a thickness of the base housing.

As an example, a recess can include a cross-sectional shape that is a stadium. In such an example, ends of the stadium may be defined by a radius, for example, consider radius that is greater than 2 mm and less than 20 mm. Where an apparatus includes a bendable display, the radius can be greater than or equal to a minimum bend radius of the bendable display. As an example, a recess may include ends that can be defined by one or more curves such as, for example, a semiellipse, a semioval, etc. As an example, a height of a recess may be in a range from 4 mm to 40 mm. For example, a recess can have a height that is greater than 4 mm and less than 40 mm.

As an example, in an open orientation, folding wings of an apparatus can be in a common plane with a center panel of the apparatus. As an example, in an open orientation, each of the folding wings can define an anhedral angle (e.g., or a cant angle) with respect to the center panel.

As an example, an apparatus can include a kickstand that is positionable to support a display housing of the apparatus. For example, a kickstand may be deployable from the display housing or may be deployable from a base housing (e.g., sliding and/or rotating out of a housing).

As an example, an apparatus can include magnets that generate an attractive force to maintain folding wings in a folded position. For example, consider magnets in ends of the folding wings to attract each other or in a combination of wings and a base housing. For example, in the closed orientation 102 of FIG. 5, ends of the wings 600 and 800 can include magnets that are paired with poles to attract each other such that the wings 600 and 800 are maintained in their folded positions. In such an example, a user may apply force to overcome the magnetic attraction force(s) to open one or both of the wings 600 and 800 (e.g., to unfold one or both of the wings 600 and 800).

As an example, in a tent orientation, a base housing of an apparatus can be rotated to an angle of greater than 180 degrees with respect to a display housing of the apparatus (e.g., via a hinge assembly that couples the base housing and the display housing).

As an example, an apparatus can include a center panel and folding wings where each of the folding wings includes at least one speaker. In such an example, unfolding of the wings can provide for angling one or more speaker axes in a direction that may be pointed toward an ear or ears of a user. In such an example, the apparatus can generate a surround sound experience (e.g., stereophonic or other multiphonic audio experience).

As an example, an apparatus can include a center panel and folding wings where each of the folding wings includes at least one camera. In such an example, the cameras can provide for capture of stereoscopic images or other multiscopic images. As an example, a camera may be a video camera. As an example, an apparatus can include a center panel and folding wings where each of the folding wings includes at least one microphone. As an example, an apparatus can include a center panel and folding wings where each of the folding wings includes at least one light. As an example, a light may be a light for illumination of a user's face, which may provide for proper or desirable intensity for image capture, video capture, etc.

As an example, an apparatus can include a video conferencing mode that generates a composite image using a first camera of a first one of folding wings and a second camera of a second one of the folding wings. As an example, an apparatus can include at least one laser scanner. For example, consider a wing with a laser scanner and another wing with a laser scanner. In such an example, the laser scanners may scan an individual, an object, etc., from different angles, optionally simultaneously. Data acquired via one or more sensors may provide for enhancing a virtual experience (e.g., in virtual and/or augmented reality, etc.) and/or generating an avatar of a user and/or an object.

As an example, a base housing of an apparatus can include a base surface where, in a closed orientation, the base surface contacts a first rim of a first one of folding wings and a second rim of a second one of folding wings. In such an example, the contacts can help to reduce risk of scratching, marring, etc., a display, while also optionally providing for stability of the base housing on a support surface such as, for example, a desktop, a tabletop, a countertop, etc.

As an example, an apparatus can include a processor; memory accessible to the processor; a base housing; a display housing that includes a center panel and folding wings that fold over the center panel to form a recess for the base housing; and a hinge assembly that couples the display housing to the base housing, where the display housing includes two hinge assemblies (e.g., center panel to wing hinge assemblies). For example, a first hinge assembly of the display housing can couple the center panel to a first wing and a second hinge assembly of the display housing can couple the center panel to a second wing. In such an example, each of the two hinge assemblies of the display housing can include links. In such an example, each of the two hinge assemblies can include rods. For example, consider the hinge assembly 1000 of FIG. 8 where rods 1200-1 to 1200-M pass through link assemblies 1100-1 to 1100-N. As an example, a hinge assembly may include links such as in one or more of the hinge assemblies 1710, 1730 and 1750 of FIGS. 17A, 17B and 17C, respectively.

As an example, an apparatus can include a hinged housing that includes a hinge assembly; and a bendable display that spans the a hinge assembly, where the hinge assembly includes links and rods, where the links include end links and intermediate links, where each of the intermediate links includes a bore, a peg, a through slot, and a guide slot, and where each of the intermediate links receives one of the rods in its through slot and another one of the rods in its bore. In such an example, one of the intermediate links can include the peg as a first peg and can include a second peg where the first peg is received in the through slot of another one of the intermediate links to define, in conjunction with one of the rods received in the through slot, a virtual pivot. For example, in FIG. 12, the link 1370 can receive a peg of the link 1320 in a through slot and a rod in the through slot, which, in combination, define a virtual pivot that is offset in a direction defined by concavity of the through slot (e.g., curvature of the through slot).

As an example, a second peg of an intermediate link can be received in a guide slot of another intermediate link or an end link. For example, in FIG. 12, a first peg of the link 1320 can be received in a through slot of the link 1370 and a second peg of the link 1320 (see the peg 1325) can be received in a guide slot of the end link 1310 (see the guide slot 1317) and a first peg of the link 1330 can be received in a through slot of the link 1360 (see the curved slot 1361) and a second peg of the link 1330 (see the peg 1335) can be received in a guide slot of the intermediate link 1320 (see the guide slot 1327). In the example of FIG. 12, the second pegs can be intra link assembly pegs and the first pegs can be inter link assembly pegs. For example, in FIG. 12 and FIG. 13, first pegs of the links 1370 and 1380 of the link assembly 1100-2 are visible (see pegs 1374 and 1384), which may be received by through slots of another link assembly.

As an example, a link can include a guide slot where the guide slot can define a path without an inflection point or can define a path with an inflection point. For example, in FIG. 14C and FIG. 14D, the shape of the guide slot 1470 is shown as defining a path without an inflection point (see. e.g., single circle in FIG. 14C) and with an inflection point (see, e.g., three circles in FIG. 14D).

As an example, a link assembly can include an end link that can include a bore or a through slot. As an example, an adjacent pair of link assemblies can include a first end link that includes a bore and another end link that includes a through slot. In such an example, the end link with the bore can be fixed for pivoting (e.g., rotation) about the bore; whereas, the other end link with the through slot may pivot (e.g., rotate) in a manner constrained by a peg and a rod received in the through slot. As explained, an intermediate link can include a bore and a through slot. As an example, an intermediate link, depending on whether or not it is adjacent to another link assembly to one side, may or may not include a second peg (e.g., an inter link assembly peg). For example, consider a side link assembly where rods may terminate such that an inter link assembly peg is not required.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 20:
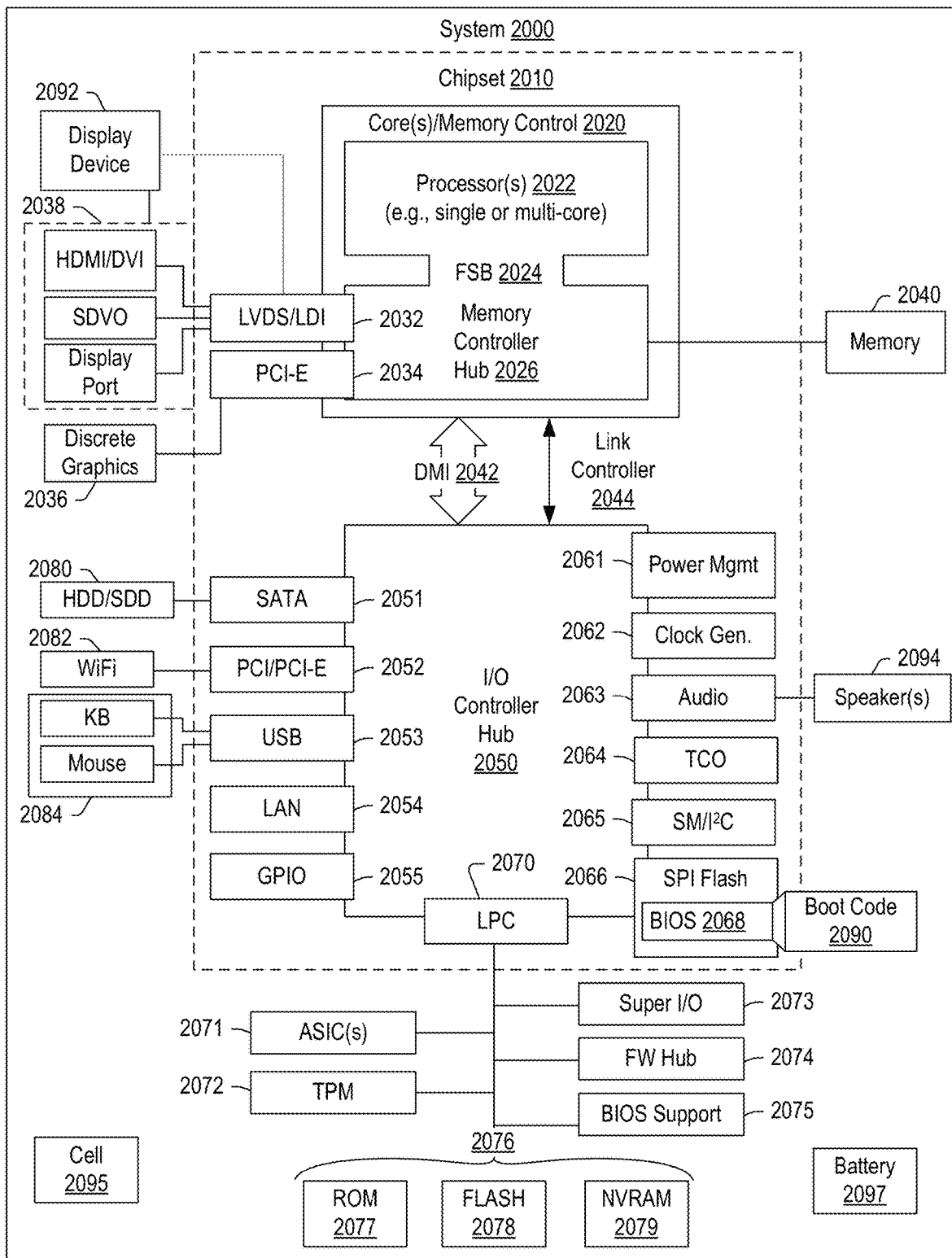
FIG. 20 is a diagram of an example of a system.

While various examples of circuits or circuitry have been discussed, FIG. 20 depicts a block diagram of an illustrative computer system 2000. The system 2000 may be or be part of a computing device or computing system, such as one of the THINKCENTRE® or THINKPAD® series of personal computers sold by Lenovo (US) Inc. of Morrisville, N.C., or a workstation computer, such as the THINKSTATION®, as sold by Lenovo (US) Inc. of Morrisville, N.C.; however, as apparent from the description herein, a display device, a folding device, or other machine may include other features or only some of the features of the system 2000.

As an example, a monitor or display device may include features such as one or more of the features included in one of the LENOVO® IDEACENTRE® or THINKCENTRE® "all-in-one" (AIO) computing devices (e.g., sold by Lenovo (US) Inc. of Morrisville, N.C.). For example, the LENOVO® IDEACENTRE® A720 computing device includes an Intel® Core i7 processor, a 27 inch frameless multi-touch display (e.g., for HD resolution of 1920×1080 or more), a NVIDIA® GeForce® GT 630M 2 GB graphics card, 8 GB DDR3 memory, a hard drive, a DVD reader/writer, integrated Bluetooth® and 802.11b/g/n Wi-Fi®, USB connectors, a 6-in-1 card reader, a webcam, HDMI in/out, speakers, and a TV tuner.

As shown in FIG. 20, the system 2000 includes a so-called chipset 2010. A chipset refers to a group of integrated circuits, or chips, that are designed to work together. Chipsets are usually marketed as a single product (e.g., consider chipsets marketed under the brands INTEL®, AMD®, etc.).

In the example of FIG. 20, the chipset 2010 has a particular architecture, which may vary to some extent depending on brand or manufacturer. The architecture of the chipset 2010 includes a core and memory control group 2020 and an I/O controller hub 2050 that exchange information (e.g., data, signals, commands, etc.) via, for example, a direct management interface or direct media interface (DMI) 2042 or a link controller 2044. In the example of FIG. 20, the DMI 2042 is a chip-to-chip interface (sometimes referred to as being a link between a "northbridge" and a "southbridge").

The core and memory control group 2020 include one or more processors 2022 (e.g., single core or multi-core) and a memory controller hub 2026 that exchange information via a front side bus (FSB) 2024. As described herein, various components of the core and memory control group 2020 may be integrated onto a single processor die, for example, to make a chip that supplants the conventional "northbridge" style architecture.

The memory controller hub 2026 interfaces with memory 2040. For example, the memory controller hub 2026 may provide support for DDR SDRAM memory (e.g., DDR, DDR2, DDR3, etc.). In general, the memory 2040 is a type of random-access memory (RAM). It is often referred to as "system memory".

The memory controller hub 2026 further includes a low-voltage differential signaling interface (LVDS) 2032. The LVDS 2032 may be a so-called LVDS Display Interface (LDI) for support of a display device 2092 (e.g., a CRT, a flat panel, a projector, etc.). A block 2038 includes some examples of technologies that may be supported via the LVDS interface 2032 (e.g., serial digital video, HDMI/DVI, display port). The memory controller hub 2026 also includes one or more PCI-express interfaces (PCI-E) 2034, for example, for support of discrete graphics 2036. Discrete graphics using a PCI-E interface has become an alternative approach to an accelerated graphics port (AGP). For example, the memory controller hub 2026 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 2050 includes a variety of interfaces. The example of FIG. 20 includes a SATA interface 2051, one or more PCI-E interfaces 2052 (optionally one or more legacy PCI interfaces), one or more USB interfaces 2053, a LAN interface 2054 (more generally a network interface), a general purpose I/O interface (GPIO) 2055, a low-pin count (LPC) interface 2070, a power management interface 2061, a clock generator interface 2062, an audio interface 2063 (e.g., for speakers 2094), a total cost of operation (TCO) interface 2064, a system management bus interface (e.g., a multi-master serial computer bus interface) 2065, and a serial peripheral flash memory/controller interface (SPI Flash) 2066, which, in the example of FIG. 20, includes BIOS 2068 and boot code 2090. With respect to network connections, the I/O hub controller 2050 may include integrated gigabit Ethernet controller lines multiplexed with a PCI-E interface port. Other network features may operate independent of a PCI-E interface.

The interfaces of the I/O hub controller 2050 provide for communication with various devices, networks, etc. For example, the SATA interface 2051 provides for reading, writing or reading and writing information on one or more drives 2080 such as HDDs, SDDs or a combination thereof. The I/O hub controller 2050 may also include an advanced host controller interface (AHCI) to support one or more drives 2080. The PCI-E interface 2052 allows for wireless connections 2082 to devices, networks, etc. The USB interface 2053 provides for input devices 2084 such as keyboards (KB), one or more optical sensors, mice and various other devices (e.g., microphones, cameras, phones, storage, media players, etc.). On or more other types of sensors may optionally rely on the USB interface 2053 or another interface (e.g., I²C, etc.). As to microphones, the system 2000 of FIG. 20 may include hardware (e.g., audio card) appropriately configured for receipt of sound (e.g., user voice, ambient sound, etc.).

In the example of FIG. 20, the LPC interface 2070 provides for use of one or more ASICs 2071, a trusted platform module (TPM) 2072, a super I/O 2073, a firmware hub 2074, BIOS support 2075 as well as various types of memory 2076 such as ROM 2077, Flash 2078, and non-volatile RAM (NVRAM) 2079. With respect to the TPM 2072, this module may be in the form of a chip that can be used to authenticate software and hardware devices. For example, a TPM may be capable of performing platform authentication and may be used to verify that a system seeking access is the expected system.

The system 2000, upon power on, may be configured to execute boot code 2090 for the BIOS 2068, as stored within the SPI Flash 2066, and thereafter processes data under the control of one or more operating systems and application software (e.g., stored in system memory 2040). An operating system may be stored in any of a variety of locations and accessed, for example, according to instructions of the BIOS 2068. Again, as described herein, a satellite, a base, a server or other machine may include fewer or more features than shown in the system 2000 of FIG. 20. Further, the system 2000 of FIG. 20 is shown as optionally include cell phone circuitry 2095, which may include GSM, CDMA, etc., types of circuitry configured for coordinated operation with one or more of the other features of the system 2000.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
a processor;
memory accessible to the processor;
a base housing;
a display housing that comprises a center panel and folding wings that fold over the center panel from a left side and a right side of the center panel to form a recess for the base housing, wherein the display housing comprises a continuous display that extends across the center panel and the folding wings; and
a hinge assembly that couples the display housing, at a bottom side of the center panel, to the base housing, wherein the folding wings fold open to form a continuous, substantially planar display with the center panel, and wherein that is stabilized via the base housing stabilizes the display housing.

2. The apparatus of claim 1, wherein, in a closed orientation, the base housing is disposed in the recess, wherein, in an intermediate orientation, the folding wings are open to define a clearance for rotation of the base housing via the hinge assembly.

3. The apparatus of claim 1, wherein a height of the recess is greater than a thickness of the base housing.

4. The apparatus of claim 1, wherein the recess comprises a cross- sectional shape that is a stadium.

5. The apparatus of claim 1, wherein the recess has a height that is greater than 4 mm and less than 40 mm.

6. The apparatus of claim 1, wherein, in an open orientation, the folding wings are disposed in a common plane with the center panel.

7. The apparatus of claim 1, wherein, in an open orientation, each of the folding wings defines an anhedral angle with respect to the center panel.

8. The apparatus of claim 1, comprising magnets that generate an attractive force to maintain the folding wings in a folded position.

9. The apparatus of claim 1, wherein, in a tent orientation, the base housing is rotated to an angle of greater than 180 degrees with respect to the display housing.

10. The apparatus of claim 1, wherein the display housing comprises two hinge assemblies.

11. The apparatus of claim 1, wherein the continuous display is a continuous flexible display supported by the center panel and the folding wings, wherein the continuous flexible display is bendable responsive to folding of the folding wings over the center panel.

12. The apparatus of claim 1, wherein the hinge assembly that couples the display housing to the base housing is attached directly to the center panel of the display housing.

13. The apparatus of claim 1, comprising magnets that generate an attractive force to maintain the folding wings in a folded position.

14. The apparatus of claim 1, wherein, in a tent orientation, the base housing is rotated to an angle of greater than 180 degrees with respect to the display housing.

15. The apparatus of claim 1, wherein each of the folding wings comprises a speaker.

16. The apparatus of claim 1, wherein each of the folding wings comprises a camera.

17. The apparatus of claim 1, wherein each of the folding wings comprises a light.

18. The apparatus of claim 1, comprising a video conferencing mode that generates a composite image using a first camera of a first one of the folding wings and a second camera of a second one of the folding wings.

19. The apparatus of claim 1, comprising at least one laser scanner.

20. The apparatus of claim 1, wherein the base housing comprises a base surface wherein, in the closed orientation, the base surface contacts a first rim of a first one of the folding wings and a second rim of a second one of the folding wings.

* * * * *